US010977689B2

(12) United States Patent
Hong et al.

(10) Patent No.: US 10,977,689 B2
(45) Date of Patent: Apr. 13, 2021

(54) MOBILE TERMINAL AND METHOD FOR CONTROLLING SAME

(71) Applicant: LG ELECTRONICS INC., Seoul (KR)

(72) Inventors: Jipyo Hong, Seoul (KR); Sooyon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 509 days.

(21) Appl. No.: 15/748,989

(22) PCT Filed: Aug. 24, 2015

(86) PCT No.: PCT/KR2015/008836
§ 371 (c)(1),
(2) Date: Jan. 30, 2018

(87) PCT Pub. No.: WO2017/018583
PCT Pub. Date: Feb. 2, 2017

(65) Prior Publication Data
US 2019/0005544 A1 Jan. 3, 2019

(30) Foreign Application Priority Data
Jul. 30, 2015 (KR) .................. 10-2015-0108230

(51) Int. Cl.
G06Q 50/30 (2012.01)
G06Q 30/02 (2012.01)

(52) U.S. Cl.
CPC ......... *G06Q 30/0265* (2013.01); *G06Q 30/02* (2013.01); *G06Q 50/30* (2013.01); *G06Q 2240/00* (2013.01)

(58) Field of Classification Search
CPC .... G06Q 30/0265; G06Q 30/02; G06Q 50/30; G06Q 2240/00; G06Q 10/02; G06Q 30/0257
See application file for complete search history.

(56) References Cited

U.S. PATENT DOCUMENTS 9,805,375 B1 * 10/2017 Carr ...................... G06Q 30/02
2002/0194065 A1 * 12/2002 Barel ................ G06Q 30/0267
705/14.36

(Continued)

FOREIGN PATENT DOCUMENTS

JP 2004-094699 A 3/2004
KR 10-0966704 B1 7/2010

(Continued)

OTHER PUBLICATIONS

Chen, Andrew, "This is what free, ad-supported Uber rides might look like. Mockups, economics, and analysis," archived Apr. 2, 2015, https://andrewchen.co/this-is-what-free-ad-supported-uber-rides-might-look-like-mockups-economics-and-analysis/ (Year: 2015).*

(Continued)

*Primary Examiner* — Kevin H Flynn
*Assistant Examiner* — Michelle E Carey
(74) *Attorney, Agent, or Firm* — Birch, Stewart, Kolasch & Birch, LLP

(57) ABSTRACT

The present invention relates to a mobile terminal, comprising: a display unit; a wireless communication unit for providing a communication interface for communication with a vehicle or an external server; and a control unit for setting, when reserving a vehicle, an amount of advertisement to be consumed in the vehicle, and for providing fee deduction information, according to the set amount of advertisement, to the display unit.

8 Claims, 24 Drawing Sheets

(56) References Cited

U.S. PATENT DOCUMENTS

| | | | |
|---|---|---|---|
| 2009/0049119 A1* | 2/2009 | Marcinkiewicz | H04L 67/06 709/203 |
| 2012/0110619 A1* | 5/2012 | Kilar | H04N 21/23424 725/34 |
| 2013/0054281 A1* | 2/2013 | Thakkar | G06Q 50/30 705/5 |
| 2014/0164099 A1* | 6/2014 | Schlesinger | G06Q 30/0277 705/14.43 |
| 2015/0248689 A1* | 9/2015 | Paul | G06Q 30/0222 705/14.23 |

FOREIGN PATENT DOCUMENTS

| | | |
|---|---|---|
| KR | 10-2013-0100822 A | 9/2013 |
| KR | 10-2013-0111912 A | 10/2013 |
| WO | WO 2006/077638 A1 | 7/2006 |

OTHER PUBLICATIONS

Hatter, Daniel, "How to Get the Short Advertisement on Hulu," Demand Media via Chron.com, Jun. 21, 2013 (Year: 2013).*

* cited by examiner

MOBILE TERMINAL AND METHOD FOR CONTROLLING SAME

CROSS REFERENCE TO RELATED APPLICATIONS

This application is the National Phase of PCT International Application No. PCT/KR2015/008836, filed on Aug. 24, 2015, which claims priority under 35 U.S.C. 119(a) to Patent Application No. 10-2015-0108230, filed in Republic of Korea on Jul. 30, 2015, all of which are hereby expressly incorporated by reference into the present application.

TECHNICAL FIELD

The present invention relates to a mobile terminal and a method for controlling the mobile terminal. More specifically, the present invention relates to a mobile terminal which allows a user to watch various contents through a display unit installed inside a vehicle while the user uses a vehicle driving service and a method for controlling the mobile terminal.

BACKGROUND ART

Terminals may be divided into mobile/portable terminals and stationary terminal according to their mobility. Mobile terminals may be further divided into handheld terminals and vehicle mounted terminals according to whether a user may carry the mobile terminal directly.

The functions of mobile terminals are being diversified. For example, a mobile terminal may provide functions such as data and voice communication; photographing and video shooting by using a camera; voice recording; playback of music files through a speaker system; and displaying an image or a video on a display unit. As such, mobile terminals are being implemented in the form of a multimedia player providing heterogeneous functions as their functions are diversified.

Meanwhile, a vehicle is an apparatus which moves a user riding in the vehicle in his or her desired direction. A car is a typical example of the vehicle. In recent years, research on communication between a vehicle and an external device (namely a mobile terminal) is being conducted actively. Moreover, research on self-driving vehicles which move autonomously without intervention of a driver is also conducted actively.

With the advancement of communication technology connecting vehicles and mobile terminals, mobile vehicle reservation services that connect passengers and vehicles through applications installed in smartphones are gradually increasing.

However, most of mobile vehicle reservation services serve as a relay for connecting a passenger and a driver to each other but do not provide a passenger with a variety of contents through a separate display mounted inside a vehicle. Therefore, it is highly required to develop a user interface environment capable of providing various contents and fee discount options to passengers who use the mobile vehicle reservation service.

DISCLOSURE

Technical Problem

An object of the present invention is to solve the problem described above and other related problems. Another object of the present invention is to provide a mobile terminal and a method for controlling the mobile terminal, which is capable of setting contents and advertisements to be consumed inside a vehicle at the time of vehicle reservation and providing fee deduction information according to the set advertisements in real time.

Technical Solution

According to one aspect of the present invention to achieve the object and other related objects, a mobile terminal includes a display unit; a wireless communication unit providing a communication interface to and from a vehicle or an external server; and a controller setting an amount of advertisements to be consumed inside the vehicle and providing fee deduction information according to the amount of advertisements at the time of vehicle reservation.

According to another aspect of the present invention, a method for controlling a mobile terminal includes executing a mobile vehicle reservation application; setting an amount of advertisements to be consumed within a vehicle; and displaying information about discounted rate according to the amount of advertisements on a display unit.

Advantageous Effects

The advantageous effects of a mobile terminal according to the present invention and a method for controlling the mobile terminal are described in the following.

According to at least one of embodiments of the present invention, the present invention provides an advantage of not only relieving a passenger's boredom but also saving a fee by allowing the passenger to watch reserved contents and advertisements through a display unit installed inside a vehicle.

Meanwhile, other various advantageous effects will be disclosed explicitly or implicitly in the following detailed descriptions according to the embodiments of the present invention.

MODE FOR INVENTION

In what follows, embodiments disclosed in this document will be described in detail with reference to appended drawings, where the same or similar constituent elements are given the same reference number irrespective of their drawing symbols, and repeated descriptions thereof will be omitted. The suffixes, 'module' and 'unit', for the constituent elements used in the following descriptions are assigned or used interchangeably only for the convenience of writing the present document and do not have separate meanings or roles distinguished from each other. Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

The vehicle described in this document is a conceptual term including a car and a motorcycle. Hereinafter, the vehicle in the present invention will be described mainly with respect to the car.

The vehicle described in this document may be regarded as a conceptual term including internal combustion engine vehicles which use an engine as a power source, hybrid vehicles which use an engine and one or more electric motors as a power source, and electric vehicles which use one or more motors as a power source.

Figure 1:
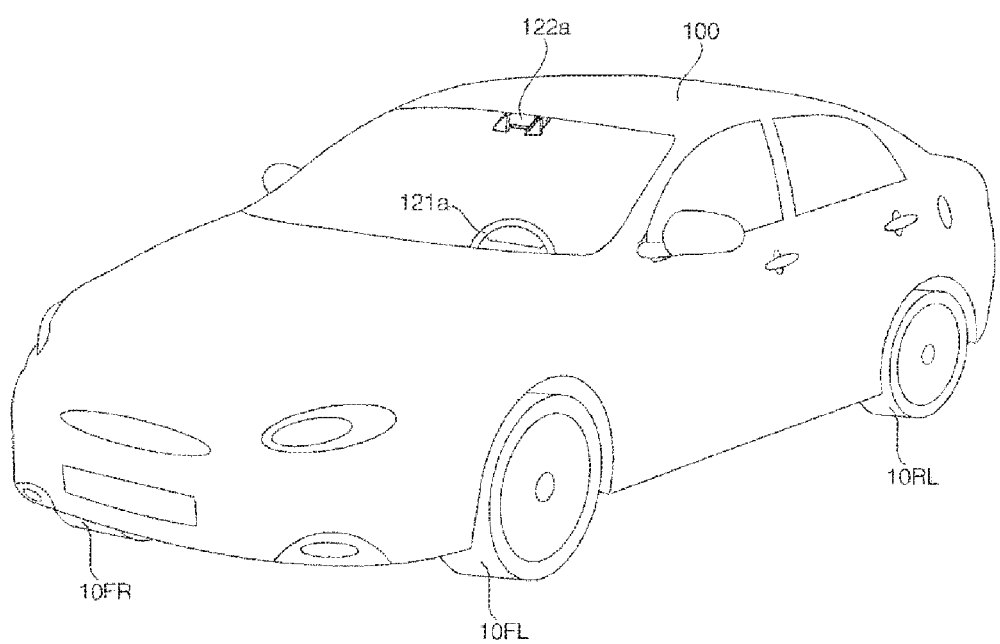
FIG. 1 is a view illustrating the exterior of a vehicle according to the present invention.
Figure 2:
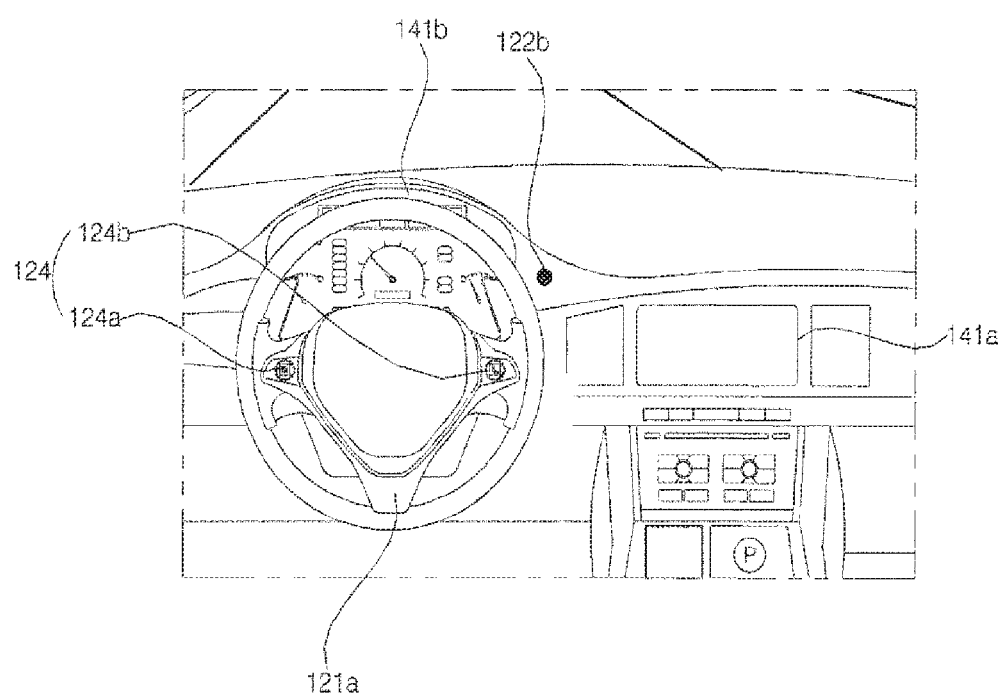
FIG. 2 is a view illustrating a cockpit module included in a vehicle according to the present invention.

FIG. 1 is a view illustrating the exterior of a vehicle according to the present invention. FIG. 2 is a view illustrating a cockpit module included in a vehicle according to the present invention.

Referring to FIGS. 1 and 2, a vehicle 100 may include wheels (10FR, 10FL, 10 RL, . . . ) rotating by a power source, steering input means 121a for adjusting a driving direction of the vehicle 100, camera 122a recording the front view of the road, and various electric units installed inside the vehicle 100.

Also, the vehicle 100 may include a camera 122b recording the interior of the vehicle; a first display unit 141 and a second display unit 141b displaying various kinds of information visually; and an interface unit 170 electrically connected to a mobile terminal 200 and a wearable device 300.

The interface unit 170 may include a mounting unit formed to mount the mobile terminal 200 and the wearable device 300; and a connecting unit connected to the mobile terminal 200 and the wearable device $300_{[W^\lambda\ 1]}$.

Figure 3:
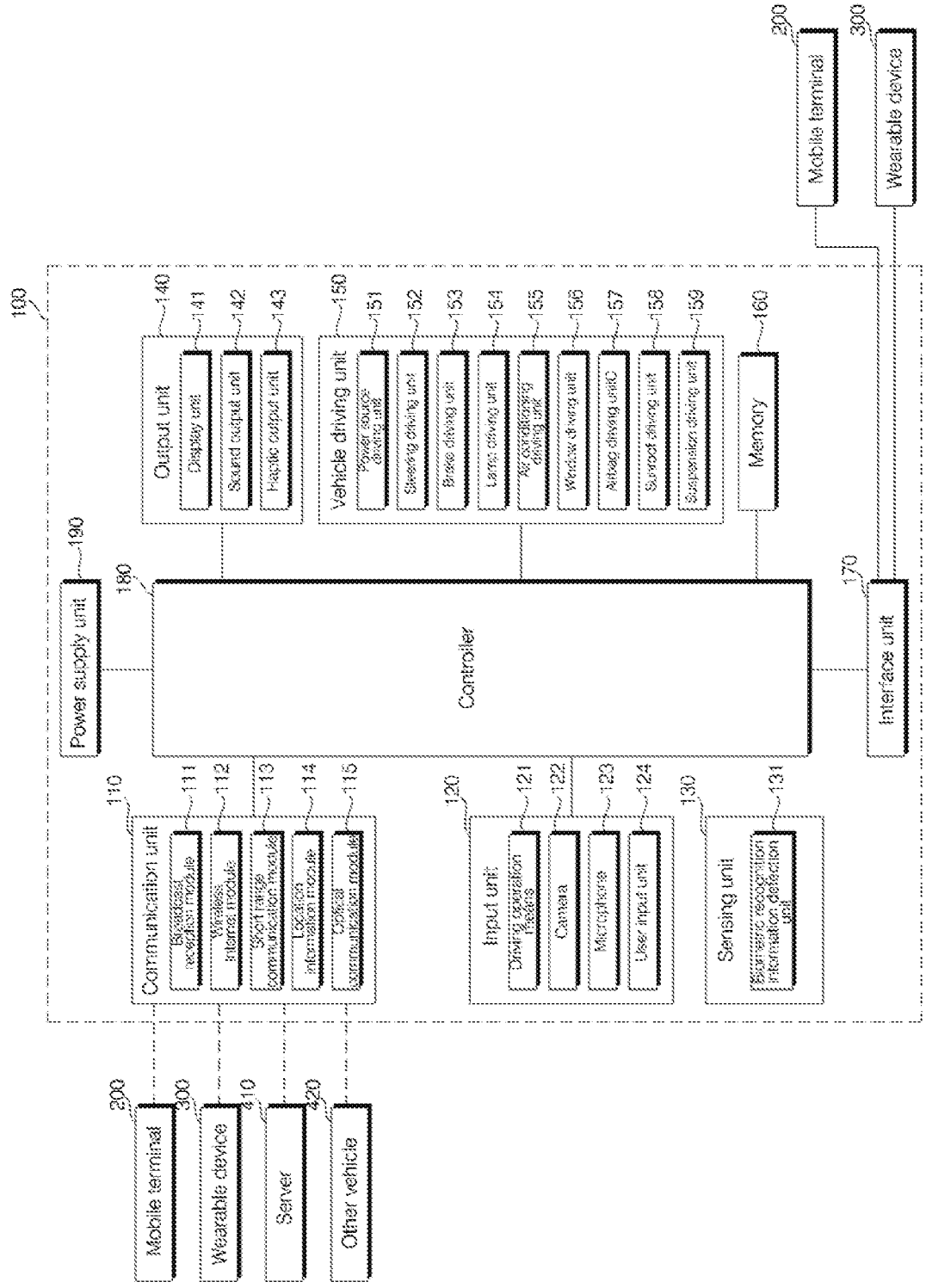
FIG. 3 is a block diagram illustrating a vehicle according to the present invention.

FIG. 3 is a block diagram illustrating a vehicle according to the present invention.

Referring to FIG. 3, the vehicle 100 may include a communication unit 110, input unit 120, sensing unit 130, output unit 140, vehicle driving unit 150, memory 160, interface unit 170, controller 180, and power supply unit 190.

The communication unit 110 may include one or more modules which enable wireless communication between the vehicle 100 and the mobile terminal 200; between the vehicle 100 and the wearable device 300; between the vehicle 100 and the external server 410; or between the vehicle 100 and other vehicle 420. Also, the communication unit 110 may include one or more modules connecting the vehicle 100 to one or more networks.

The communication unit 110 may include a broadcast reception module 111, wireless Internet module 112, short range communication module 113, location information module 114, and optical communication module 115.

The broadcast reception module 111 receives a broadcast signal or broadcasting-related information from an external broadcasting management server through a broadcast channel. Here, broadcasting includes radio broadcasting or TV broadcasting.

The wireless Internet module 112 refers to a module for wireless Internet connection and may be installed inside or outside the vehicle 100. The wireless Internet module 112 is configured to transmit and receive a radio signal to and from a communication network based on wireless Internet technologies.

Wireless Internet technologies include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced), where the wireless Internet module 112 transmits and receives data by using at least one wireless Internet technology from the range including even the Internet technology not listed above.

The short range communication module 113 is intended for short range communication and supports short range communication by using at least one of Bluetooth, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Universal Serial Bus).

The short range communication module 113 may perform short range communication between the vehicle 100 and at least one external device by forming a short range wireless area network.

As shown in FIG. 4, the short range communication module 113 installed in the vehicle 100 may include an NFC communication module 113_1, Bluetooth communication module 113_2, and WiFi communication module 113_3.

The NFC communication module 113_1 may perform data communication with devices located within a distance of 10 cm (preferably less than 4 cm) by using RFID (Radio Frequency Identification)-related very short-range contactless data transfer technology. In the present embodiment, the NFC communication module 113_1 may be installed at the door portion of the driver side of the vehicle but is not limited to the specific location.

The Bluetooth communication module 113_2 may perform data communication with devices located within a radius of 10 to 100 m by using Bluetooth which is one of short range wireless communication specifications. For reference, Bluetooth is a short-range wireless networking technology jointly developed by the Bluetooth Special Interest Group (SIG) formed in 1998 by five companies including Ericsson, IBM, and Toshiba.

The Wi-Fi communication module 113_3 is a wireless LAN technology that combines wireless technology with Hi-Fi (High Fidelity) and enables high-performance wireless communication. The wireless LAN technology underlies local area networks (LANs) capable of providing high-speed Internet within a predetermined distance from a place at which a wireless access point (access point) is installed.

The location information module 114 is intended for obtaining location of the vehicle 100, a typical example of which is a GPS (Global Positioning System) module. For example, by utilizing a GPS module, a mobile terminal may obtain its location by using signals transmitted from GPS satellites.

The optical communication module 115 may include a light transmitting unit and a light receiving unit.

The light receiving unit may convert a light signal to an electric signal to receive information. The light receiving unit may include a photo diode (PD) for receiving light. A photo diode may convert light to an electric signal. For example, the light receiving unit may receive information of a vehicle ahead through the light emitted from a light source included in the vehicle ahead.

The light transmitting unit may include at least one light emitting device for converting an electric signal to an optical signal. Here, it is desirable that LED (Light Emitting Diode) may be used as a light emitting device. The light transmitting unit converts an electric signal to an optical signal and transmits it to the outside. For example, the light transmitting unit may emit an optical signal to the outside through blinking of a light emitting device corresponding to a predetermined frequency. According to an embodiment, the light transmitting unit may include a plurality of light emitting device arrays. According to an embodiment, the light transmitting unit may be integrated with the lamp installed in the vehicle 100. For example, the light transmitting unit may correspond to at least one of headlights, tail lights, brake lights, signal lights, and sidelights.

The input unit 120 may include a driving operation means 121, camera 122, microphone 123, and user input unit 124.

The driving operation means 121 receives a user input for driving the vehicle 100. The driving operation means 121 may include a steering input means 121a, shift input means (not shown), acceleration input means (not shown), and brake input means (not shown).

The steering input means 121a receives a driving direction input of the vehicle 100 from the user. The steering input means 121a may preferably be implemented in the form of a wheel so that a steering input may be generated by rotation of the steering input means 121a. According to an embodiment, the steering input means 121a may also be formed in the form of a touch screen, touch pad, or button.

The shift input means receives the input of park (P), drive (D), neutral (N), and reverse (R) of the vehicle 100 from the user. The shift input means may be preferably implemented in the form of a lever. According to an embodiment, the shift input means may also be formed in the form of a touch screen, touch pad, or button.

The acceleration input means receives an input for accelerating the vehicles 100 from the user. The brake input means receives an input for decelerating the vehicle 100 from the user. The acceleration input means and the brake input means may be preferably implemented in the form of a pedal. According to an embodiment, the acceleration input means or brake input means may also be formed in the form of a touch screen, touch pad, or button.

The camera 122 may include an image sensor and an image processing module. The camera 122 may process still images or videos obtained from the image sensor (for example, CMOS or CCD). The image processing module may process a still image or a video obtained through the image sensor, extract necessary information, and deliver the extracted information to the controller 180. Meanwhile, the vehicle 100 may include a first camera 122a photographing the front image of the road from the vehicle and a second camera 122b photographing the interior of the vehicle.

The first camera 122a may be made of a stereo camera to obtain stereo images of the front view of the road from the vehicle. At this time, the image processing module may provide depth information of an object detected in the stereo image through binocular parallax information.

The second camera 122b may obtain the image of a passenger. The second camera 122b may obtain an image for biometric recognition of the passenger.

The microphone 123 may process an external audio signal into electric data. The processed data may be utilized in various ways according to the function performed in the vehicle 100. The microphone 123 may convert a voice command of the user into electric data. The converted electric data may be delivered to the controller 180.

Meanwhile, according to an embodiment, the camera 122 or the microphone 123 may be an element belonging to the sensing unit 130 but not to the input unit 120.

The user input unit 124 is intended for receiving information from the user. If information is received through the user input unit 124, the controller 180 may control the operation of the vehicle 100 according to the input information. The user input unit 124 may include a touch-type input means or mechanical input means. The user input unit 124 may be disposed in the steering input means 121a.

The sensing unit 130 senses a signal related to driving of the vehicle 100. To this purpose, the sensing unit 130 may include a collision sensor, wheel sensor, speed sensor, tilt sensor, weight detection sensor, heading sensor, yaw sensor, gyro sensor, position module, vehicle forward/reverse sensor, battery sensor, fuel sensor, tire sensor, steering sensor sensing rotation of the steering wheel, vehicle internal temperature sensor, vehicle internal humidity sensor, ultrasonic sensor, radar, and lidar.

From the sensors, the sensing unit 130 may obtain sensing signals about vehicle collision information, vehicle driving direction information, vehicle location information (GPS information), vehicle attitude information, vehicle speed information, vehicle acceleration information, vehicle inclination information, vehicle forward/reserve information, battery information, fuel information, tire information, vehicle lamp information, vehicle internal temperature information, and vehicle internal humidity information.

Meanwhile, in addition to the sensors above, the sensing unit 130 may further include an acceleration pedal sensor, pressure sensor, engine speed sensor, air flow sensor (AFS), intake air temperature sensor (ATS), water temperature sensor (WTS), throttle position sensor (TPS), TDC sensor, and crank angle sensor (CAS).

The sensing unit 130 may include biometric recognition information detection unit 131. The biometric recognition information detection unit 131 detects and obtains biometric recognition information. The biometric recognition information may include fingerprint information, iris-scan information, retina-scan information, hand geometry information, facial recognition information, and voice recognition information. The biometric recognition information detection unit 131 may include a sensor for sensing biometric recognition information of the passenger. Here, the camera 122 and the microphone 123 may operate as sensors. The biometric recognition information detection unit 131 may obtain hand shape information and facial recognition information through the second camera 122b. The biometric recognition information detection unit 131 may obtain voice recognition information through the microphone 123.

Meanwhile, the biometric recognition information detection unit 131 may further include a fingerprint recognition scanner, iris recognition scanner, or retina recognition scanner to obtain the fingerprint recognition information, iris recognition information, or retina recognition information of the passenger.

The output unit 140 is intended for outputting the information processed by the controller 180 and may include a display unit 141, sound output unit 142, and haptic display unit 143.

The display unit 141 may display the information processed in the controller 180. For example, the display unit 141 may display vehicle-related information. Here, the vehicle-related information may include vehicle control information for direct control of the vehicle or vehicle driving assistance information for providing a driving guide to the vehicle driver.

The display unit 141 may include at least one of liquid crystal display (LCD), thin film transistor-liquid crystal display (TFT LCD), organic light-emitting diode (OLED), flexible display, 3D display, and e-ink display.

The display unit 141 may implement a touch screen by forming a mutual layer structure with a touch sensor or by being integrated with the touch sensor. The touch screen may function as the user input unit 124 providing an input interface between the vehicle 100 and the user and at the same time, provide an output interface between the vehicle 100 and the user. In this case, the display unit 141 may include a touch sensor which detects a touch input on the display unit 141 so that a control command may be received by a touch method. If a touch input is applied to the display unit 141, the touch sensor detects the touch input, and the controller 180 may generate a control command corresponding to the touch input. The content input by the touch method may be a character or a number or an instruction in various modes or a specifiable menu item.

Meanwhile, two or more display units 141 may be used. For example, the first display unit 141 may be implemented in the form of a cluster so that a driver may check information while driving. Being installed in one area of the center fascia, the second display unit 141b may operate as an AVN (Audio Video navigation) device.

Meanwhile, according to an embodiment, the display unit 141 may be implemented in the form of a HUD (Head Up Display). When the display unit 141 is implemented by using the HUD, information may be displayed through a transparent display installed in the wind shield. Or the display unit 141 may display information through an image projected by a projection module on the wind shield.

The sound output unit 142 converts an electric signal from the controller 180 to an audio signal and outputs the audio signal. To this purpose, the sound output unit 142 may be equipped with a speaker. The sound output unit 142 is also capable of outputting a sound corresponding to the motion received by the user input unit 124.

The haptic output unit 143 generates a haptic output. For example, the haptic output unit 143 vibrates the steering wheel, safety belt, and seat so that the user may recognize the output.

The vehicle driving unit 150 may control the operation of various devices of the vehicle. The vehicle driving unit 150 may include a power source driving unit 151, steering driving unit 152, brake driving unit 153, lamp driving unit 154, air conditioning driving unit 155, window driving unit 156, airbag driving unit 157, sun-roof driving unit 158, and suspension driving unit 159.

The power source driving unit 151 may perform electronic control of a power source of the vehicle 100.

For example, when the power source is a fossil fuel-based engine (not shown), the power source driving unit 151 may perform electronic control of the engine. The electronic control may control the output torque of the engine. When the power source driving unit 151 is an engine, it may limit the speed of the vehicle by limiting the engine output torque according to the control of the controller 180.

In another example, when the power source uses electric motors (not shown), the power source driving unit 151 may perform motor control. In this case, rotating speed or torque of the motor may be controlled.

The steering driving unit 152 may perform electronic control of the steering apparatus inside the vehicle. The electronic control may change the driving direction of the vehicle.

The brake driving unit 153 may perform electronic control of the brake apparatus (not shown) inside the vehicle 100. For example, the brake driving unit may reduce the speed of the vehicle by controlling the operation of the brake disposed at each wheel. In another example, by operating the brakes disposed separately on the left and the right wheel differently, the brake driving unit may adjust the driving direction of the vehicle to the left or right.

The lamp driving unit 154 may control the turn-on/off of the lamps disposed inside or outside the vehicle. Also, the lamp driving unit may control the intensity or direction of light of the lamps. For example, the lamp driving unit may perform control of direction indicator lamps and brake lamps.

The air conditioning driving unit 155 may perform electronic control of the air conditioner inside the vehicle 100. For example, when the temperature inside the vehicle is high, the air conditioning driving unit controls the air conditioner so that cool air may be supplied into the vehicle.

The window driving unit 156 may perform electronic control of the window apparatus inside the window 100. For example, the window driving unit 156 may control opening or closing side windows in the left and right side of the vehicle.

The airbag driving unit 157 may perform electronic control of the airbag apparatus inside the vehicle. For example, in the case of an emergency, the airbag driving unit may control the airbag to be inflated.

The sun-roof driving unit 158 may perform electronic control of the sun roof apparatus (not shown) inside the vehicle. For example, the sun-roof driving unit may control opening or closing of the sun-roof.

The suspension driving unit 159 may perform electronic control of the suspension apparatus inside the vehicle. For example, when the vehicle is moving on the road with undulations, the suspension driving unit may control the suspension apparatus so that the vibration of the vehicle 100 may be reduced.

The memory 160 is electrically connected to the controller 180. The memory 180 may store basic data for a unit; control data for controlling the operation of the unit; and input and output data. In terms of hardware, the memory 190 may be implemented by various types of storage medium such as ROM, RAM, EPROM, flash drive, and hard drive.

The memory 160 may store biometric information of the user corresponding to at least one of the mobile terminal and the wearable device. For example, the memory 160 may store fingerprint information, iris-scan information, retina-scan information, hand geometry information, facial recognition information, or voice recognition information of the user, which matches the first wearable device.

The interface unit 170 may serve as a path to various kinds of external devices connected to the vehicle. For example, the interface unit 170 may be equipped with a port that may be connected to the mobile terminal 200 or wearable device 300, and through the port, the interface unit may be connected to the mobile terminal 200 or wearable device 300. In this case, the interface unit 170 may exchange data with the mobile terminal 200 or wearable device 300.

Meanwhile, the interface unit 170 may serve as a path to supply electric energy to the mobile terminal 200 or wearable device 300 connected to the vehicle. When the mobile terminal 200 or wearable device 300 is electrically connected to the interface unit 170, the interface unit 170 may supply the electric energy supplied from the power supply unit 190 to the mobile terminal 200 or wearable device 300 according to the control of the controller 180.

The controller 180 may control the overall operation of each unit inside the vehicle 100. Here, the controller 180 may be called an ECU (Electronic Control Unit).

In terms of hardware, the controller 180 may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, microprocessors, and electric units for performing other functions.

The power supply unit 190 may supply power required to operate individual constituent elements according to the control of the controller 180. In particular, the power supply unit 190 may obtain power from the battery (not shown) inside the vehicle.

The mobile terminal described in this document may correspond to a mobile phone, smart phone, laptop computer, digital broadcast terminal, PDA (Personal Digital Assistants), PMP (Portable Multimedia Player), navigation, slate PC, tablet PC, ultrabook, or wearable device such as a smart watch, smart glass, or HMD (Head Mounted Display).

However, it will be apparent to those skilled in the art that the configuration according to the embodiments described in this document may also be applied to stationary terminals such as a digital TV, a desktop computer, and a digital signage except for those specific cases applicable only to mobile terminals.

Figure 4A:
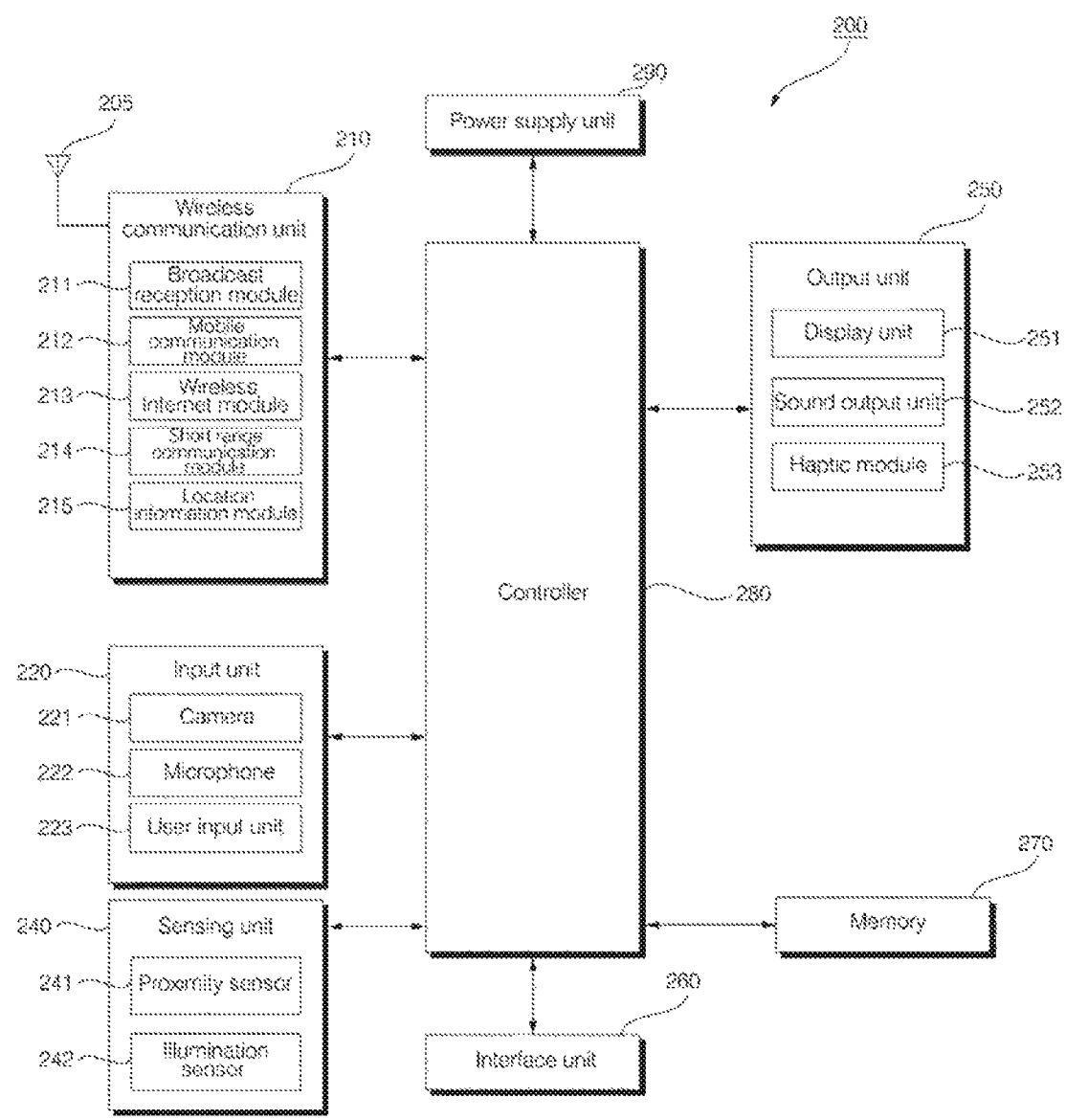
FIG. 4a is a block diagram illustrating a mobile terminal according to the present invention.
Figure 4B:
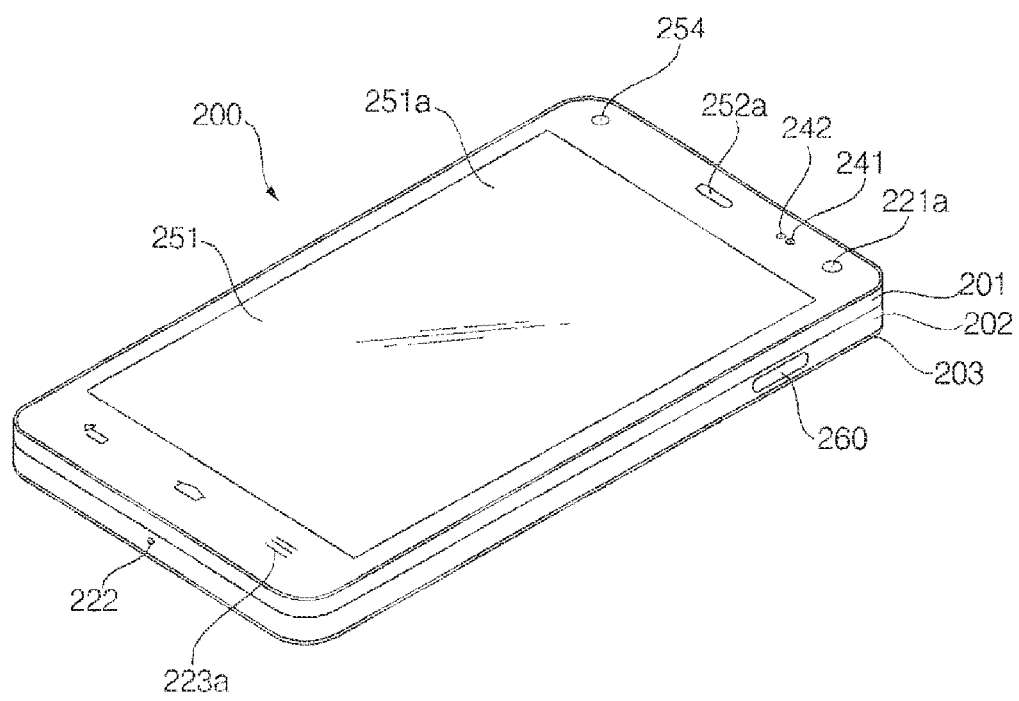
FIGS. 4b and 4c are conceptual views of one example of a mobile terminal according to the present invention, seen from different directions.
Figure 4C:
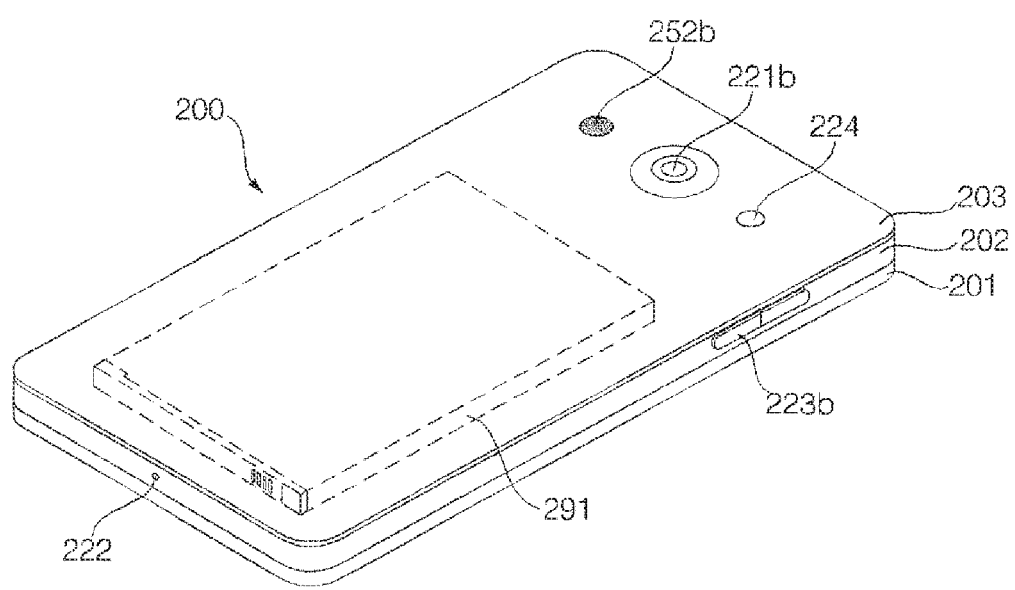

Referring to FIGS. 4*a* to 4*c*, FIG. 4*a* is a block diagram for describing a mobile terminal according to the present invention; and FIGS. 4*b* and 4*c* are conceptual views of one example of a mobile terminal according to the present invention, seen from different directions.

A mobile terminal 200 may include a wireless communication unit 210, input unit 220, detection unit 240, output unit 250, interface unit 260, memory 270, controller 280, and power supply unit 290. The components shown in FIG. 4*a* are not essential for implementing a mobile terminal; therefore, the mobile terminal described in this document may have more or fewer components than the components listed above.

More specifically, among the components listed above, the wireless communication unit 210 may include one or more modules that enables wireless communication between the mobile terminal 200 and a wireless communication system, between the mobile terminal and the vehicle 100, between the mobile terminal 200 and other mobile terminal 200, or between the mobile terminal 200 and an external server. Also, the wireless communication unit 210 may include one or more modules connecting the mobile terminal 200 to one or more networks.

The wireless communication unit 210 may include at least one of a broadcast receiving module 211, mobile communication module 212, wireless Internet module 213, short range communication module 214, and location information module 215.

The input unit 220 may include a camera 221 or an image input unit for receiving an image signal, a microphone 222 or an audio input unit for receiving an audio signal, a user input unit 223 (for example, a touch key or a mechanical key) for receiving information from the user. The voice data or image data collected from the input unit 220 may be analyzed and processed by the control command of the user.

The sensing unit 240 may include one or more sensors for sensing at least one of information within the mobile terminal, information about the surroundings of the mobile terminal, and user information. For example, the sensing unit 240 may include a proximity sensor 241, illumination sensor 242, touch sensor, acceleration sensor, magnetic sensor, G-sensor, gyroscope sensor, motion sensor, RGB sensor, infrared sensor, finger scan sensor, ultrasonic sensor, microphone 222, battery gauge, environmental sensor (for example, a barometer, hygrometer, thermometer, radiation sensor, thermal sensor, and gas sensor), chemical sensor (for example, an electronic nose, healthcare sensor, and biometric sensor). Meanwhile, the mobile terminal disclosed in the present document may combine and use the information sensed by at least two or more of the sensors.

The output unit 250 is intended for generating an output related to visual, auditory, or tactile sense and includes at least one of a display unit 251, sound output unit 252, haptic module 253, and optical output unit 254. The display unit 251 may implement a touch screen by forming a mutual layer structure with a touch sensor or by being integrated with the touch sensor. The touch screen may function as the user input unit 223 providing an input interface between the mobile terminal 200 and the user and at the same time, provide an output interface between the mobile terminal 200 and the user.

The interface unit 260 serves as a channel for connecting various types of external devices connected to the mobile terminal 200. The interface unit 260 may include at least one of a wired/wireless headset port, external charger port, wired/wireless data port, memory card port, port connecting a device equipped with an identification module, audio I/O port, video I/O port, and earphone port. As an external device is connected to the interface unit 260, the mobile terminal 200 may perform relevant control related to the external device connected.

Also, the memory 270 stores data supporting various functions of the mobile terminal 200. The memory 270 may store a plurality of application programs or applications running in the mobile terminal 200; and data and commands for operation of the mobile terminal 200. At least some of the application programs may be downloaded from an external server via wireless communication. Also, at least some of the application programs may be pre-installed in the mobile terminal 200 at the time of manufacturing to provide basic functions (for example, incoming call reception, phone call, message reception, and message sending function) of the mobile terminal 200. Meanwhile, the application program may be stored in the memory 270, installed in the mobile terminal 200, and operated by the controller 280 to perform the operation (or function) of the mobile terminal.

In addition to the operations related to the application program, the controller 280 typically controls the overall operation of the mobile terminal 200. The controller 280 may process signals, data, and information input or output through the constituent elements above and execute an application program stored in the memory 270 to provide the user with or process appropriate information or functions.

Also, the controller 280 may control at least part of the constituent elements described with reference to FIG. 4a to run an application program stored in the memory 270. Furthermore, to run the application program, the controller 280 may combine at least two or more constituent elements included in the mobile terminal 200.

The power supply unit 290 receives external and internal power according to the control of the controller 280 and supplies the received power to each of constituent elements included in the mobile terminal 200. The power supply unit 290 includes a battery, where the battery may be an embedded-type battery or a replaceable battery.

At least some of the constituent elements above may operate in cooperation with one another to implement an operation, control, or control method of the mobile terminal according to various embodiments of the present invention described below. Also, the operation, control, or control method of the mobile terminal may be implemented in the mobile terminal by running at least one of application programs stored in the memory 270.

In what follows, before describing various embodiments implemented through the mobile terminal 200 described above, the constituent elements listed above will be described in more detail with reference to FIG. 4a.

First, referring to the wireless communication unit 210, the broadcast receiving module 211 of the wireless communication unit 210 receives broadcast signals and/or broadcast-related information from an external broadcast management server through a broadcast channel. The broadcast channel may include a satellite channel and a terrestrial channel. Two or more broadcast receiving modules may be provided to the mobile terminal 200 for simultaneous broadcast reception or broadcast channel switching of at least two broadcast channels.

The mobile communication module 212 may transmit and receive a radio signal to and from at least one of a base station, an external terminal, and a server via a mobile communication network constructed according to technology standards for mobile communication or communication methods (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access) and LTE-A (Long Term Evolution-Advanced)).

The radio signal may include a voice call signal, video call signal, or various types of data according to transmission and reception of text/multimedia messages.

The wireless Internet module 213 refers to a module for wireless Internet connection and may be installed inside or outside the vehicle 100. The wireless Internet module 213 is configured to transmit and receive a radio signal to and from a communication network based on wireless Internet technologies.

Wireless Internet technologies include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced), where the wireless Internet module $213_{[W^\lambda{}_2]}$ transmits and receives data by using at least one wireless Internet technology from the range including even the Internet technology not listed above.

Considering the fact that a wireless Internet connection based on the WiBro, HSDPA, HSUPA, GSM, CDMA, WCDMA, LTE, or LTE-A is established through a mobile communication network, the wireless Internet module 213 which performs a wireless Internet connection through the mobile communication network may also be regarded as one kind of the mobile communication module 212.

The short range communication module 113 is intended for short range communication and supports short range communication by using at least one of Bluetooth, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Universal Serial Bus). The short range communication module 214 may support wireless communication between the mobile terminal 200 and a wireless communication system; between the mobile terminal 200 and the vehicle 100; between the mobile terminal 200 and a different mobile terminal 200; or between the mobile terminal 200 and a network to which the different mobile terminal 200 (or an external server) belongs through a short range wireless area network. The short range wireless area network may be a short range wireless personal area network.

Here, the different mobile terminal 200 may be a wearable device (for example, a smart watch, smart glass, and HMD (Head Mounted Display)) capable of exchanging data (or interoperable) with the mobile terminal according to the present invention. The short range communication module 214 may detect (or recognize) a wearable device in the surroundings of the mobile terminal 200, which may communicate with the mobile terminal 200. Moreover, when the detected wearable device is a device authenticated to communicate with the mobile terminal 200 according to the present invention, the controller 280 may transmit at least part of the data processed in the mobile terminal 200 to the wearable device through the short range communication module 214. Therefore, the user of the wearable device may use the data processed in the mobile terminal 200 through the wearable device. For example, according to the operation above, when the mobile terminal 200 receives a call, the user may perform a phone call through a wearable device or when the mobile terminal 200 receives a message, the user may check the received message through a wearable device.

The location information module 215 is intended for obtaining the location of the mobile terminal (or the current position), a typical example of which includes a GPS (Global Positioning System) module or WiFi (Wireless Fidelity) module. For example, by utilizing the GPS module, the mobile terminal may obtain the location of the mobile terminal by using the signals transmitted from GPS satellites. In another example, by using the Wi-Fi module, the mobile terminal may obtain the location of the mobile terminal by using the information of a wireless AP (Access Point) which transmits or receives a wireless signal to and from the Wi-Fi module. Depending on the needs, the location information module 215 may substitutionally or additionally perform any of the other functions of the wireless communication unit 210 to obtain data about the location of the mobile terminal. The location information module 215 is a module used for obtaining the location (or the current position) of the mobile terminal, and is not limited to the module for directly calculating or acquiring the location of the mobile terminal.

Next, the input unit 220 is intended for receiving image information (or signal), audio information (or signal), data, or information input from a user. The input unit 220 may include one or more cameras 221 for receiving image information. The camera 221 processes an image frame such as a still image or a video image obtained by the image sensor in the video communication mode or photographing mode. The processed image frame may be displayed on the display unit 251 or stored in the memory 270. Meanwhile, a plurality of cameras 221 installed in the mobile terminal 200 may be arranged to form a matrix structure, and a plurality of images taken from various view angles or with varying foci may be provided to the mobile terminal 200 through the camera 221 having the matrix structure. In addition, a plurality of cameras 221 may be arranged in a stereo structure so as to obtain a left image and a right image for realizing a stereoscopic image.

The microphone 222 processes an external sound signal into electrical voice data. The processed voice data may be utilized in various ways according to a function (or a running application program) being executed in the mobile terminal 200. Meanwhile, various noise reduction algorithms for eliminating noise generated while an external sound signal is received may be implemented in the microphone 222.

The user input unit 223 is intended for receiving information from the user. When information is received through the user input unit 223, the controller 280 controls the operation of the mobile terminal 200 so as to deal with the input information. The user input unit 223 may include a mechanical input means (or mechanical keys such as buttons located on the front, rear, or side of the mobile terminal 200, dome switch, jog wheel, and jog switch) and touch-type input means. As one example, the touch-type input means may include virtual keys displayed on the touch screen through software processing, soft keys, or visual keys, or touch keys disposed outside the touch screen. Meanwhile, the virtual key or visual key may be displayed in various forms on the touch screen. For example, the virtual key or visual key may be displayed in the form of a graphic object, text, icon, video, or a combination thereof.

Meanwhile, the sensing unit 240 senses at least one of information in the mobile terminal, information in the surroundings of the mobile terminal, and user information; and generates a sensing signal corresponding to the sensed information. The controller 280 may control the driving or operation of the mobile terminal 200 on the basis of the sensed signal or may perform data processing, function or operation related to an application program installed in the mobile terminal 200. Typical sensors among various sensors that may be included in the sensing unit 240 will be described in more detail.

First, the proximity sensor 241 refers to a sensor that detects the presence of an object approaching a predetermined detection surface or the presence of an object in the vicinity of the detection surface without mechanical contact by using an electromagnetic force or infrared light. The proximity sensor 241 may be disposed in the inner area of the mobile terminal enclosed by the touch screen described above or near the touch screen.

Examples of the proximity sensor 241 include a transmission type photoelectric sensor, direct reflection type photoelectric sensor, mirror reflection type photoelectric sensor, high frequency oscillation type proximity sensor, capacitive proximity sensor, magnetic proximity sensor, and infrared proximity sensor. When the touch screen is an electrostatic type, the proximity sensor 241 may be configured to detect approaching of the object from a change in electric field due to the approaching of the object exhibiting conductivity. In this case, the touch screen (or touch sensor) itself may be classified as a proximity sensor.

On the other hand, for the convenience of description, the operation of recognizing an object located on the touch screen while the object is not in contact with the touch screen is referred to as "proximity touch", and the operation of recognizing an object which actually contacts the touch screen is called "contact touch". The position of a proximity touch of an object on the touch screen is the position on the touch screen when the object makes a proximity touch at right angles to the touch screen. The proximity sensor 241 is capable of sensing a proximity touch and a proximity touch pattern (for example, a proximity touch distance, proximity touch direction, proximity touch speed, proximity touch time, proximity touch position, and proximity touch movement state). Meanwhile, the controller 280 processes data (or information) corresponding to the proximity touch operation and the proximity touch pattern sensed through the proximity sensor 241 as described above, and also displays the visual information corresponding to the processed data on the touch screen. Furthermore, the controller 280 may control the mobile terminal 200 so that different operations or data (or information) are processed according to whether a touch input to the same point on the touch screen is a proximity touch or a contact touch.

The touch sensor detects a touch (or a touch input) applied to the touch screen (or display unit 251) by using at least one of various touch methods including a resistance film type, capacitive type, infrared type, ultrasonic type, and magnetic type touch method.

As one example, the touch sensor may be configured to convert a change of pressure applied to a specific portion of a touch screen or a change of capacitance generated at a specific portion thereof into an electrical input signal. The touch sensor may be configured to detect a position and an area of a touch applied by a touch object which applies the touch on the touch sensor, a pressure at the time of touch, and capacitance at the time of touch. Here, the touch object may be an object which applies a touch on the touch sensor, for example, a finger, touch pen, stylus pen, or a pointer.

As described above, when there is a touch input to the touch sensor, the corresponding signal(s) is sent to the touch controller. The touch controller processes the signal(s) and transmits the corresponding data to the controller 280. Accordingly, the controller 280 may know which portion of the display unit 251 is touched. Here, the touch controller may be a separate constituent element not belonging to the control unit 280 or and may be the controller 280 itself.

Meanwhile, the controller 280 may perform different controls or perform the same control according to the type of the touch object touching the touch screen (or a touch key disposed outside the touch screen). Whether to perform different controls or to perform the same control according to the type of the touch object may be determined according to the current operation state of the mobile terminal 200 or a running application program.

On the other hand, the touch sensors and the proximity sensors as described above may be used independently or in combination to detect a short touch (or tap), long touch, multi touch, drag touch, flick touch, pinch-in touch, pinch-out touch, swipe touch, and hovering touch applied on the touch screen.

The ultrasonic sensor may recognize the position information of a target object to be sensed by using ultrasonic waves. Meanwhile, the controller 280 may calculate the position of a wave generating source through the information sensed by an optical sensor and a plurality of ultrasonic sensors. The position of the wave generating source may be calculated by using the fact that light is much faster than an ultrasonic wave, that is, the time needed for the light to reach the optical sensor is much shorter than the time needed for an ultrasonic wave to reach the ultrasonic sensor. More specifically, the position of the wave generating source may be calculated from the time difference of the travel time measured by the ultrasonic wave to reach the ultrasonic sensor with respect to the travel time of light which is used as a reference signal.

Meanwhile, the camera 221 described above in the structure of the input unit 220 includes at least one of a camera sensor (for example, CCD and CMOS), photo sensor (or image sensor), and laser sensor.

The camera 221 and the laser sensor may be combined with each other to sense a touch on a sensing target with respect to a three-dimensional stereoscopic image. The photo sensor may be arranged to scan the movement of a sensing target adjacent to the touch screen. More specifically, the photo sensor mounts photo diodes and transistors (TRs) in a row/column direction and scans the object placed on the photo sensor using an electrical signal that changes according to the amount of light applied to the photo diodes. In other words, the photo sensor performs coordinate calculation of the sensing target according to the amount of change of light, through which position information of the sensing object may be obtained.

The display unit 251 displays (outputs) the information processed in the mobile terminal 200. For example, the display unit 251 may display execution screen information of an application program running in the mobile terminal 200 or UI (User Interface)/GUI (Graphic User Interface) information according to the execution screen information.

Also, the display unit 251 may be configured as a stereoscopic display unit which displays stereoscopic images.

The stereoscopic display unit may employ various three-dimensional display systems such as a stereoscopic system (which uses glasses), autostereoscopic system (glasses-free system), and projection system (holographic system).

The sound output unit 252 may output audio data received by the wireless communication unit 210 in the call signal reception, conversation mode, recording mode, voice recognition mode, or broadcast reception mode; or audio data stored in the memory 270. The sound output unit 252 may also output a sound signal related to the function performed in the mobile terminal 200 (for example, a call signal reception sound and a message reception sound). The sound output unit 252 may include a receiver, speaker, and buzzer.

The haptic module 253 generates various tactile effects that may be felt by the user. A typical example of a tactile effect generated by the haptic module 253 is vibration. The intensity and pattern of a vibration generated by the haptic module 253 may be controlled by the user's selection or by the configuration of the controller. For example, the haptic module 253 may synthesize different vibrations to generate another one or output them in a sequential order.

In addition to vibration, the haptic module 253 may generate various tactile effects including a pin arrangement vertically moving with respect to the contact skin surface; a spraying force or a suction force of the air through an injection port or suction port; a touch on the skin surface; a contact of an electrode; an effect due to an electrostatic stimulus; and an effect of reproducing a cold and warmth sensation using a heat absorbing or pyrogenic substance.

The haptic module 253 may be implemented not only to deliver a tactile sensation through a direct contact but also to make the user feel a tactile effect through a muscular sensation at the finger or arm. Two or more haptic modules 253 may be installed according to the configuration of the mobile terminal 200.

The optical output unit 254 outputs a signal for notifying of the occurrence of an event by using the light of a light source of the mobile terminal 200. Examples of events that occur in the mobile terminal 200 may include message reception, call signal reception, missed call, alarm, schedule notification, email reception, and information reception through an application.

The signal output from the optical output unit 254 is implemented when the mobile terminal emits light of a single color or multiple colors through the front or rear surface. The output signal may be terminated when the mobile terminal detects that the user has confirmed an event in question.

The interface unit 260 serves as a path for communication with all external devices connected to the mobile terminal 200. The interface unit 260 receives data from an external device, receives power and supplies the power to each constituent element in the mobile terminal 200, or allows internal data of the mobile terminal 200 to be transmitted to an external device. For example, the interface unit 260 may include a wired/wireless headset port, external charger port, wired/wireless data port, memory card port, a port connecting to a device equipped with an identification module, audio I/O port, video I/O port, and earphone port.

Meanwhile, the identification module may include a user identity module (UIM), subscriber identity module (SIM), and universal subscriber identity module (USIM) as a chip for storing various kinds of information for authenticating the use right of the mobile terminal 200. A device with the identification module (hereinafter it is called an "identification device") may be manufactured in the form of a smart card. Therefore, the identification device may be connected to the terminal 200 through the interface unit 260.

Also, when the mobile terminal 200 is connected to an external cradle, the interface unit 260 may serve as a path through which power from the cradle is supplied to the mobile terminal 200 or a path through which various command signals input from the cradle by the user are delivered to the mobile terminal 200. The various command signals or the power input from the cradle may be operated as an indicator for recognizing that the mobile terminal 200 has been mounted correctly into the cradle.

The memory 270 may store a program for the operation of the controller 280 and temporarily store input/output data (for example, a phone book, message, still image, and video). The memory 270 may store data about vibrations and sounds of various patterns outputted when a touch is applied on the touch screen.

The memory 270 may include at least one type of storage medium from among a flash memory type, hard disk type, solid state disk (SDD) type, silicon disk drive (SDD) type, multimedia card micro type, card type memory (for example, SD or XD memory), random access memory (RAM), static random access memory (SRAM), read-only memory (ROM), EEPROM (Erasable Programmable Read-Only Memory), PROM (Programmable Read-Only Memory), magnetic memory, magnetic disk, and optical disk. The mobile terminal 200 may be operated in association with a web storage that performs a storage function of the memory 270 on the Internet.

Meanwhile, as described above, the controller 280 controls an operation related to an application program and an overall operation of the mobile terminal 200. For example, when the state of the mobile terminal satisfies a predetermined condition, the controller 280 may execute or release a lock state which restricts the user from entering control commands to applications.

The controller 280 may perform control and processing related to voice communication, data communication, and video call or may perform pattern recognition that recognizes a handwriting input or a drawing input performed on the touch screen as characters and images, respectively. Furthermore, the controller 280 may control any one or a plurality of the constituent elements described above in order to implement various embodiments described below in the mobile terminal 200 according to the present invention.

The power supply unit 290 receives external and internal power under the control of the controller 280 and supplies power required for operation of each constituent element. The power supply unit 290 may include a battery, where the battery may be an embedded battery configured to be charged and may be integrated into the terminal body for charging in a detachable manner.

In addition, the power supply unit 290 may include a connection port, and the connection port may be configured as one example of the interface 260 through which an external charger supplying power for charging the battery is connected electrically.

As another example, the power supply unit 290 may be configured to charge the battery in a wireless manner without using the connection port. In this case, the power supply unit 290 may receive power from an external wireless power transmission apparatus by using at least one of an inductive coupling method based on the magnetic induction phenomenon and a magnetic resonance coupling method based on the electromagnetic resonance phenomenon.

Meanwhile, in what follows, various embodiments may be embodied in a recording medium readable by a computer or a similar device by using software, hardware, or a combination thereof, for example.

Up to this point, the proposed configurations of the vehicle and the mobile terminal according to the present invention have been described in detail with reference to FIG. 1 to FIG. 4. In what follows, according to one embodiment of the present invention, a mobile terminal capable of setting contents and advertisements to be consumed in a vehicle at the time of vehicle reservation and providing discounted rate information in real time according to the amount of the advertisements and a method for controlling the mobile terminal will be described in detail.

Figure 5:
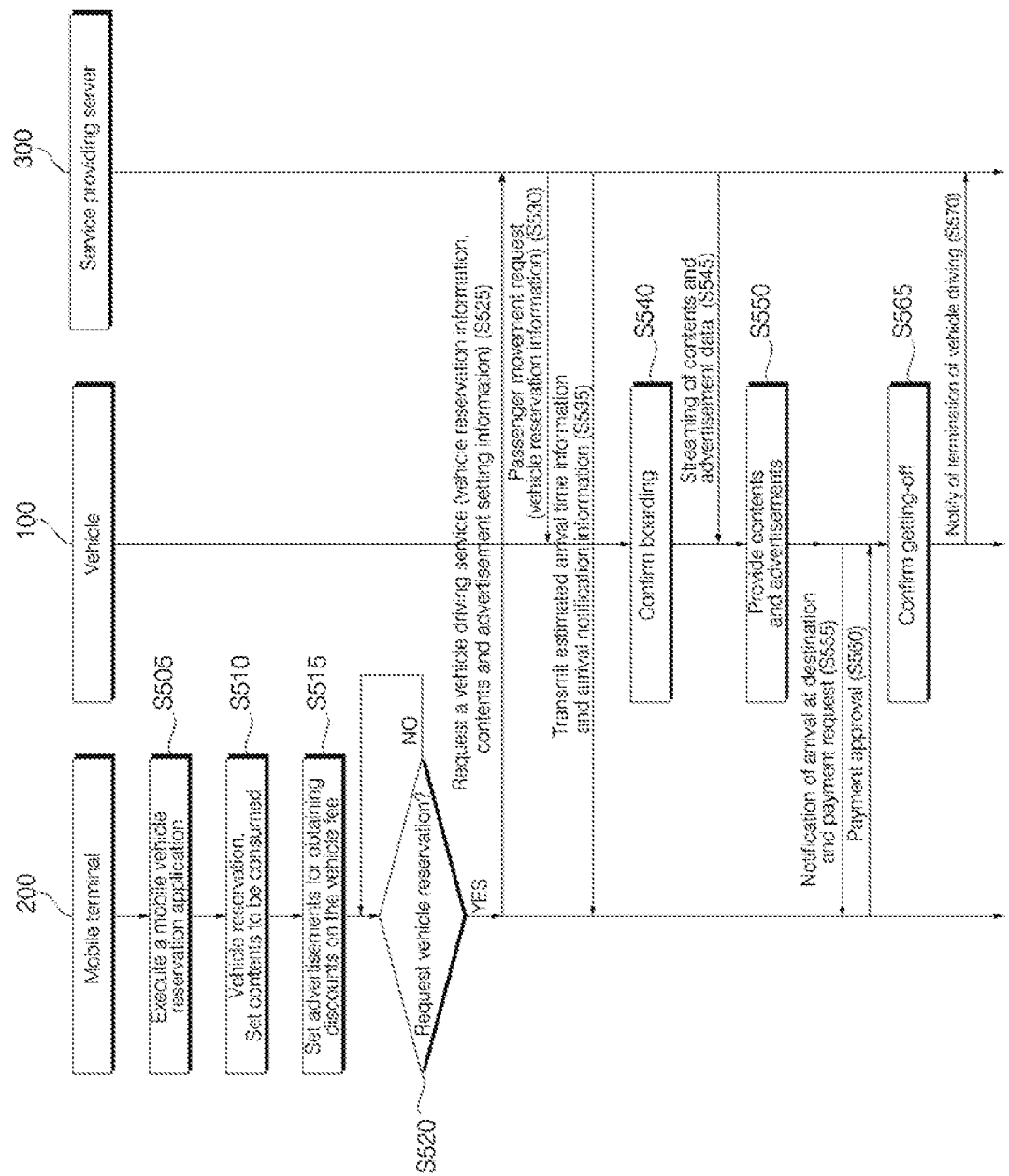
FIG. 5 is a flow diagram illustrating the overall operation of a mobile vehicle reservation system according to one embodiment of the present invention.

FIG. 5 is a flow diagram illustrating the overall operation of a mobile vehicle reservation system according to one embodiment of the present invention.

Referring to FIG. 5, a mobile vehicle reservation system according to one embodiment of the present invention includes a mobile terminal 200 in which a mobile vehicle reservation application is installed, a vehicle 100 that moves passengers to their destination, and a service providing server 300 for providing a vehicle driving service to the passengers. At this time, the vehicle 100 may be a self-driving vehicle or a vehicle driven by a driver.

Passengers who want to use the vehicle driving service may execute a mobile vehicle reservation application installed in their mobile terminal 200 to reserve a vehicle and set the contents and advertisements to be consumed in the vehicle.

More specifically, the mobile terminal 200 may execute a mobile vehicle reservation application according to a user command and display an execution screen of the corresponding application on the display unit 251, S505.

The mobile terminal 200 may set a departure place/destination place/departure date and time/number of boarding passengers based on the user input received through the execution screen and then select a path, vehicle type/screen size, and contents to watch S510. At this time, the mobile terminal 200 may in real-time provide estimated fee information calculated in accordance with the selected path, vehicle type/screen size, or contents to watch.

Also, the mobile terminal 200 may set the amount of the advertisements for the discount, watching time of the advertisements, and the advertisement categories based on the user input received through the execution screen S515. Similarly, the mobile terminal 200 may provide discounted estimated charge information in real time according to the amount of the advertisements, watching time of the advertisements, and the categories of the advertisements.

Afterwards, if a user command requesting reservation of the vehicle is received S520, the mobile terminal 200 may transmit a signal requesting a vehicle driving service to the service providing server 300, S525. At this time, the service request signal may include vehicle reservation information and information for setting contents and advertisements.

When receiving the service request signal, the service providing server 300 may transmit a driving request signal requesting movement of the passenger to the vehicle 100. At this time, the driving request signal may include the location information of the passenger and the vehicle reservation information.

Also, upon receiving the service request signal, the service providing server 300 may transmit information about estimated arrival time of the vehicle 100, arrival point of the vehicle, and arrival notification information to the mobile terminal 200, S535.

When a passenger gets into the vehicle 100 according to the notification information provided by the mobile terminal 200, the vehicle 100 may confirm boarding of the passenger through wireless communication with the mobile terminal 200 or through a detection sensor installed inside the vehicle and notify the service providing server 300 of the boarding of the passenger S540.

The vehicle 100 may receive contents and advertisement data preset by the passenger from the service providing server 300 and provide the contents and advertisement data through the display unit 141 installed inside the vehicle S545, S550. Meanwhile, as another example, the vehicle 100 may read the contents and advertisement data stored in the memory 160 and provide the contents and the advertisement data through the display unit 141 without having to receive the contents and the advertisement data from the service providing server 300.

Arriving at a predetermined destination, the vehicle 100 may display a message indicating the arrival at the destination on the display unit 141 or output a voice signal indicating the arrival at the destination through the sound output unit 142.

Also, the vehicle 100 may transmit a signal notifying of the arrival at the destination and a signal requesting payment to the mobile terminal 200, S555. When the passenger confirms the payment amount and then hold the mobile terminal 200 near a POS terminal or a wireless charger installed in the vehicle 100, the mobile terminal 200 may proceed with the mobile payment using a predetermined payment application S560.

When the passenger of the mobile terminal 200 gets off the vehicle 100, the vehicle 100 may confirm getting-off of the passenger through wireless communication with the mobile terminal 200 or a detection sensor installed inside the vehicle and notify the service providing server 300 of the getting-off of the passenger S565, S570.

As described above, according to the mobile vehicle reservation service of the present invention, passengers are allowed to watch reserved contents and advertisements through a display unit installed inside a vehicle so that they may not only relieve their boredom during riding but also save a fee.

Figure 6:
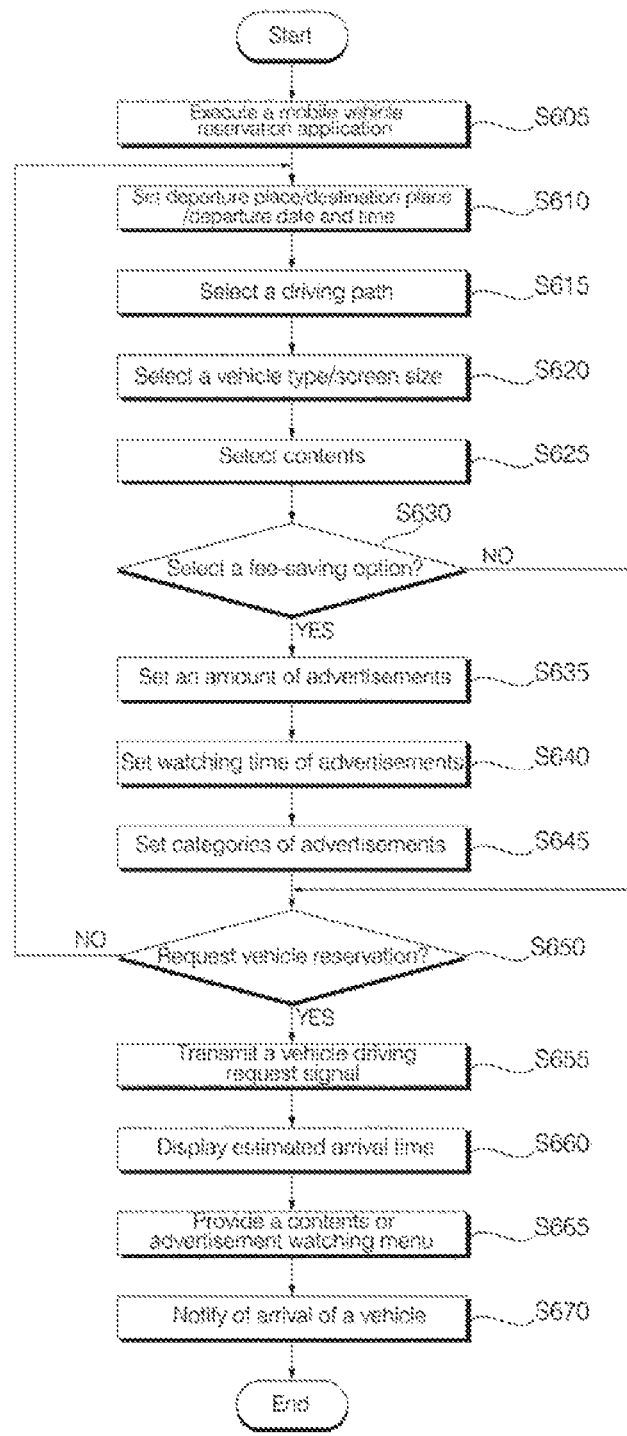
FIG. 6 is a flow diagram illustrating the operation of a mobile terminal reserving a vehicle and setting contents and advertisements to be consumed in the vehicle.

FIG. 6 is a flow diagram illustrating the operation of a mobile terminal reserving a vehicle and setting contents and advertisements to be consumed in the vehicle.

Referring to FIG. 6, the controller 280 may execute a mobile vehicle reservation application according to the user command and display an execution screen of the corresponding application on the display unit 251, S605. At this time, the execution screen of the application may be composed of a screen for setting a departure place/destination place, screen for setting a driving path, screen for setting a vehicle/screen size, contents setting screen, and advertisement setting screen.

The controller 280 may set the departure/destination place of the user (namely passenger)/departure date and time/number of passengers according to the user input received through the screen for setting the departure/destination place S610. After completing the setting, the controller 280 may display a screen for setting a driving path on the display unit 251. At this time, the path setting screen may provide a recommended path, shortest path, and free path from the departure place to the destination place; and estimated fee information for each path.

The controller 280 may select a driving path preferred by the user of the mobile terminal 200 on the basis of the user input received through the path setting screen S615. After selecting the driving path, the controller 280 may display a screen for setting a vehicle/screen size on the display unit 251. At this time, the screen for setting a vehicle/screen size may provide information about various vehicle types and information about the size of a personal/public screen provided by each vehicle type.

From the user input received through the screen for setting a vehicle/screen size, the controller 280 may select a vehicle and screen size preferred by the user of the mobile terminal 200, S620. The controller 280 may in real-time provide estimated rate information calculated according to the selected vehicle type/screen size. After selecting the vehicle type/screen size, the controller 280 may display a contents setting screen on the display unit 251. At this time, the contents setting screen may provide a list of recommended contents, a list of recently watched contents, and contents search items.

According to the user input received through the contents setting screen, the controller 280 may select contents to be watched by the user of the mobile terminal 200 inside the vehicle while the vehicle is driving S625. When contents are selected, the controller 280 may display information about play time of the selected contents, price for watching the contents, free watch option, and estimated price on the display unit 251.

When selection of the contents is completed or a fee-saving option menu is selected S630, the controller 280 may display an advertisement setting screen on the display unit 251. At this time, the advertisement setting screen may provide items for setting an amount of advertisements, advertisement watch time, and advertisement categories.

According to the user input received from the advertisement setting screen, the controller 280 may sequentially set the amount of advertisements to be watched by the user of the mobile terminal 200 inside the vehicle while the vehicle is driving, watch time of the advertisements, and advertisement categories S635, S640, S645. And the controller 280 may provide in real-time information about the estimated rate discounted according to the amount of selected advertisements, watch time of the advertisements, and advertisement categories.

If a user command requesting vehicle reservation based on the setting items described above is received S650, the controller 280 may transmit a signal requesting a vehicle driving service to the service providing server 300, S655. On the other hand, if a user command requesting vehicle reservation is not received, the controller 280 may repeatedly perform the operations of the S610 to the S645 step described above.

The controller 280 may receive information about the estimated arrival time of a vehicle from the service providing server 300 and displays the received information on the display unit S660. Also, the controller 280 may provide a menu for proposing contents or advertisements to watch while the user of the mobile terminal 200 is waiting for the vehicle S665. When the menu is selected, the controller 280 may receive contents or advertisement data from the service providing server 300 and display the received contents or advertisement data on the display unit 251.

Upon arrival of the vehicle, the controller 280 may receive vehicle arrival notification information from the service providing server 300 and display the received information on the display unit 251, S670. Accordingly, the user of the mobile terminal 200 may move to the arrival place of the vehicle and get on the vehicle.

As described above, the mobile terminal according to the present invention may set contents and advertisements to be consumed in a vehicle at the time of vehicle reservation and provide discounted rate information in real time according to the amount of the advertisements.

Figure 7:
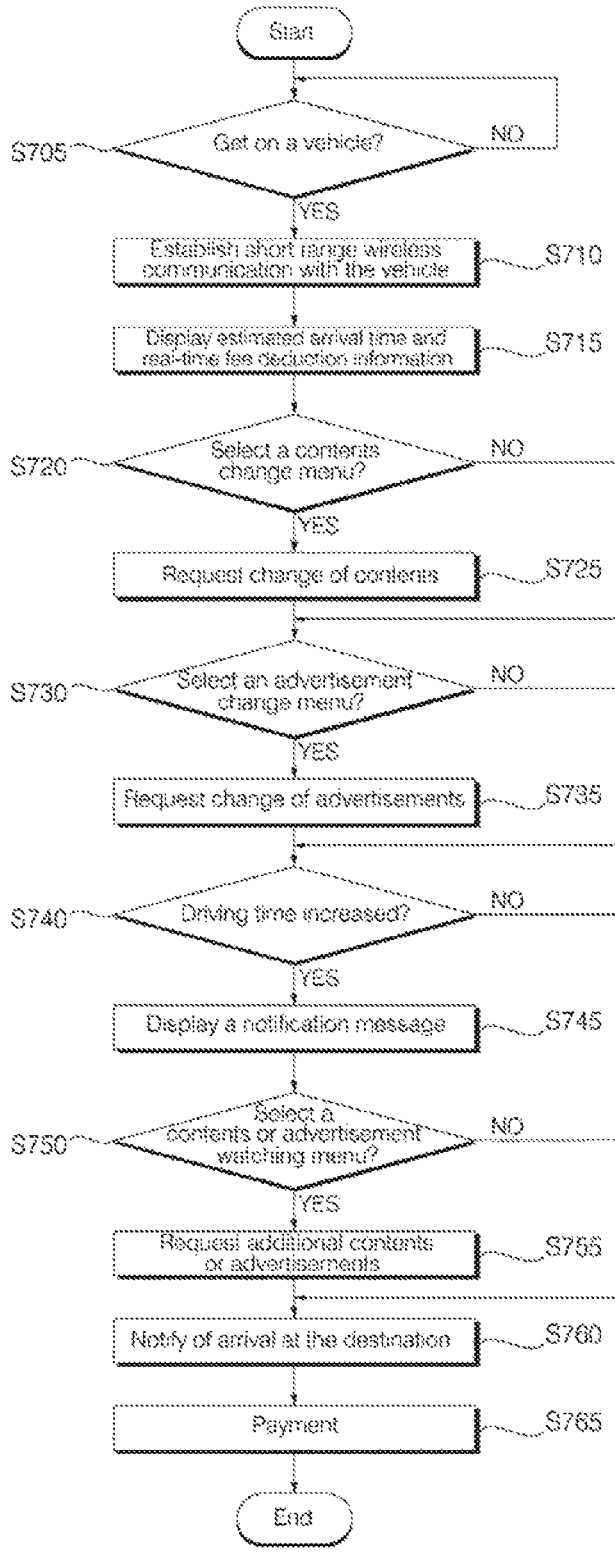
FIG. 7 is a flow diagram illustrating the operation of a mobile terminal capable of providing real-time rate deduction information during driving of a vehicle and changing or adding contents and advertisements to be consumed inside the vehicle.

FIG. 7 is a flow diagram illustrating the operation of a mobile terminal capable of providing real-time rate deduction information during driving of a vehicle and changing or adding contents and advertisements to be consumed inside the vehicle.

Referring to FIG. 7, when the user of the mobile terminal 200 gets on the vehicle 100, S705, the controller 280 may connect the vehicle 100 to a short range wireless communication network S710. At this time, the mobile terminal 200 may receive various services from the vehicle 100 through the short range wireless communication network.

After detecting boarding of a passenger through the short range wireless communication or other method, the vehicle 100 may play the contents and/or advertisements reserved by the passenger on the display unit 141. Accordingly, the user of the mobile terminal 200 may watch the contents and/or advertisements displayed on the display unit 141 inside the vehicle while the vehicle is moving.

The controller 280 may receive information about the current location, information about estimated arrival time, real-time rate discount information, and information about an estimated price from the serving providing server 300 or the vehicle 100 while driving and display the received information on the display unit 251, S715.

Also, while the vehicle is driving, the controller 280 may display a contents change menu for changing contents to be consumed and an advertisement change menu for adjusting the amount of advertisements to be consumed on the display unit.

If the content change menu is selected S720, the controller 280 may display a contents setting screen for changing the contents to be consumed on the display unit 251. The controller 280 selects contents to be changed based on the user input received through the contents setting screen and transmits a signal requesting playback of the selected contents to the service providing server 300 or the vehicle 100, S725. The vehicle 100 may play the changed contents on the display unit 141 in response to the request signal.

If the advertisement change menu is selected S730, the controller 280 may display an advertisement setting screen for changing the amount of the advertisements, watching time of the advertisements, and advertisement categories on the display unit 251. The controller 280 changes the amount of the advertisements, watching time of the advertisements, and advertisement categories based on the user input received through the advertisement setting screen and transmits a signal requesting playing of the changed advertisements to the service providing server 300 or to the vehicle 100, S735. Similarly, the vehicle 100 may play the changed advertisements on the display unit 141 in response to the request signal.

Meanwhile, when driving time increases due to traffic condition S740, the controller 280 may provide a menu proposing additional watching of contents and/or advertisements during the delay along with information about estimated delay time/estimated additional charge S745.

If a contents or advertisement watching menu is selected S750, the controller 280 may transmit a signal requesting playing of the contents or advertisements to the service providing server 300 or to the vehicle 100, S755. In response to the request signal, the vehicle 100 may further play the contents or advertisements on the display unit 141.

When the vehicle 100 arrives at the destination, the controller 280 may receive information indicating that the vehicle 100 has arrived at the destination and information about the payment from the service providing server 300 or the vehicle 100 and display the information on the display unit 251, S760. At this time, the payment information may include estimated charge information, final charge information, and difference between the estimated charge and the final charge.

In addition, when there are remaining contents and advertisements still to be played at the destination, the controller 280 may display on the display unit 251 a menu inquiring whether to watch the remaining contents and advertisements after getting off the vehicle.

When the user checks the payment amount and then holds the mobile terminal 200 near a POS terminal or a wireless charger installed in the vehicle 100, the controller 280 may proceed with mobile payment using a predetermined payment application S765.

As described above, the mobile terminal according to the present invention may change or add contents and advertisements to be consumed in the vehicle while the vehicle is driving and provide information about the fee discounted according to the amount of changed or added advertisements in real time.

In what follows, with reference to FIG. 8 to FIG. 14, an operation of a mobile terminal for reserving a vehicle driving service and setting contents and advertisements to be consumed in a vehicle will be described in detail.

Figure 8:
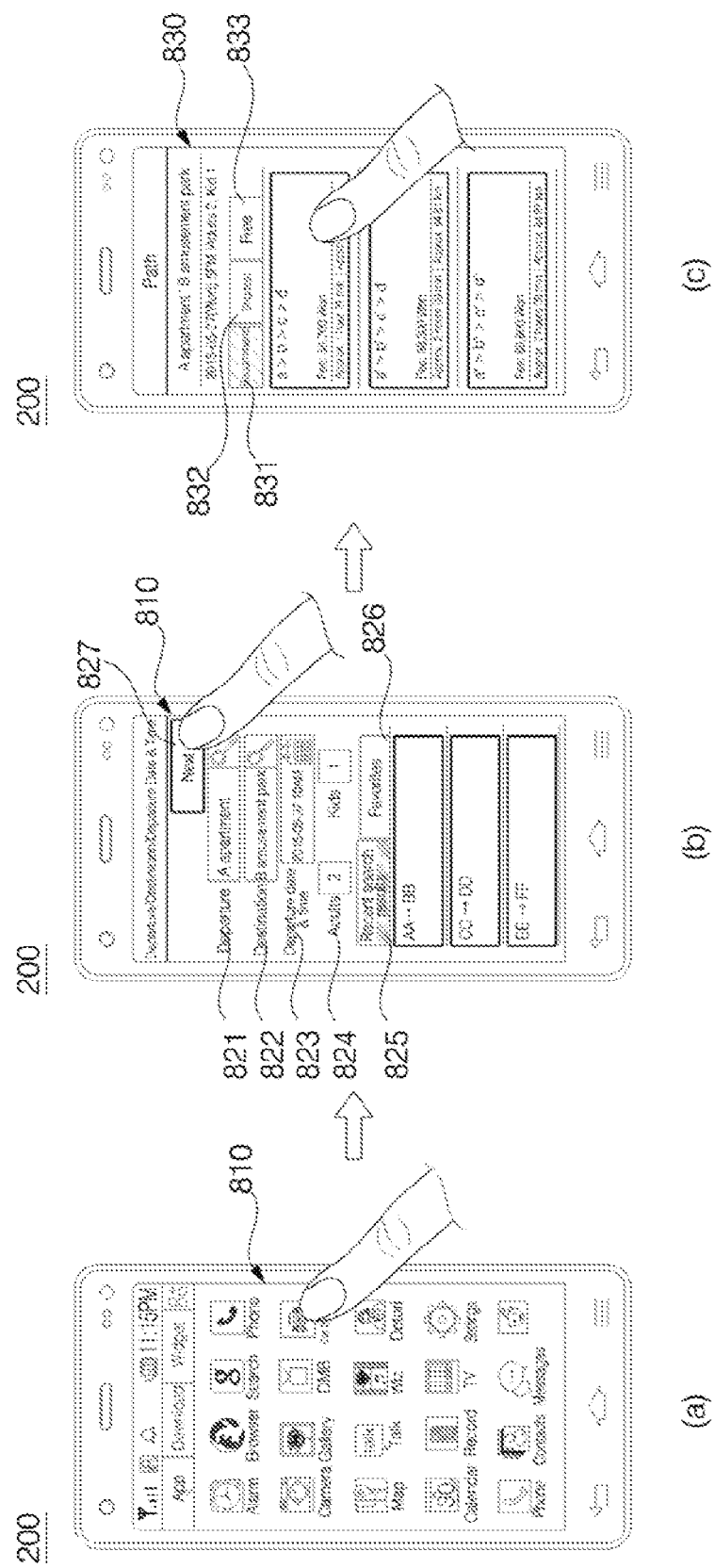
FIGS. 8 and 9 illustrate the operation of a mobile terminal for setting vehicle reservation and contents to be consumed.
Figure 9:
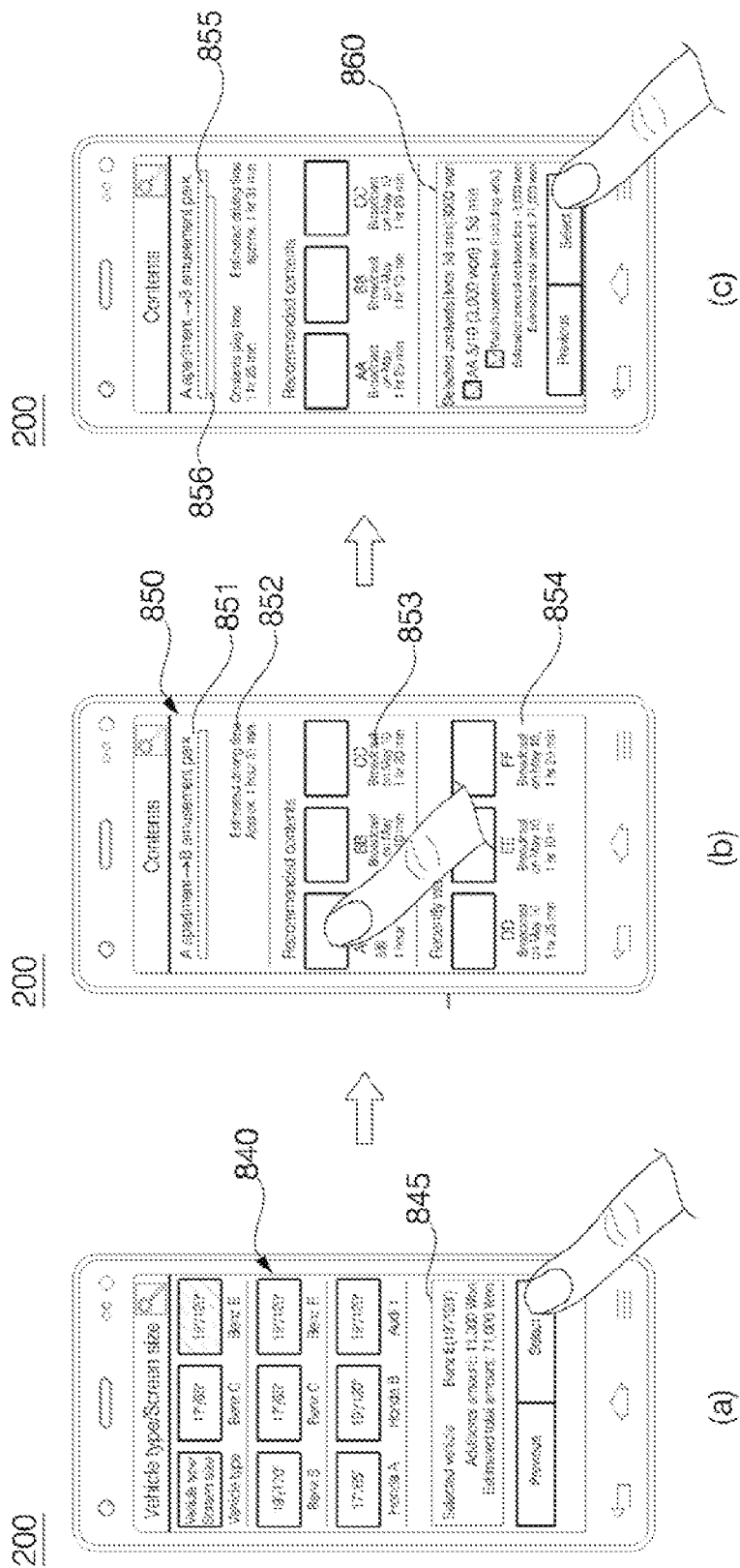

FIGS. 8 and 9 illustrate the operation of a mobile terminal for setting vehicle reservation and contents to be consumed.

Referring to FIGS. 8 and 9, the mobile terminal 200 may display a home screen 810 showing user commands on the display unit 251. At this time, the home screen is assumed to include a car booking icon 815.

While the home screen 810 is displayed, if the car booking icon 815 is selected, the mobile terminal 200 may display a screen for setting a departure place/destination place 820 as shown in FIG. 8(b) on the display unit 251. At this time, the screen for setting the departure/destination place 820 may include an item for setting the departure place 821, an item for setting the destination place 822, an item for setting the departure date and time 823, an item for setting the number of passengers 824, a search list of recent drives 825, a list of drives registered as favorites 826, and next icon 827.

The mobile terminal 200 may set the departure place/destination place/departure date and time of the user (namely passenger)/the number of passengers according to the user input received through the screen for setting a departure/destination place 820.

After the setting is completed, if the next icon 827 is selected, the mobile terminal 200 may display a path setting screen 830 as shown in FIG. 8(c) on the display unit 251. At this time, the path setting screen 830 may include a list of recommended paths from a departure place to a destination place 831, a list of shortest paths 832, and a list of free paths 833. Each path list 831, 832, 833 may include detailed information about a driving path, information about estimated driving time and estimated fee, and information about a driving distance.

The mobile terminal 200 may select a driving path preferred by the user according to the user input received through the path setting screen 830. After the driving path is selected, the mobile terminal 200 may display a screen for setting a vehicle type/screen size 840 as shown in FIG. 9(a) on the display unit 251. At this time, the screen for setting a vehicle type/screen size 840 may include a list of vehicle types and information about the size of a personal/public screen provided by each vehicle type.

From the user input received through the screen for setting a vehicle type/screen size 840, the mobile terminal 200 may select a vehicle and screen size preferred by the user. At this time, the mobile terminal 200 may display a pop-up window 845 including information about the selected vehicle type/screen size and information about an estimated fee calculated according to the selected vehicle type/screen size on the display unit 251.

After selecting the vehicle type/screen size, the mobile terminal 200 may display a contents setting screen 850 as shown in FIG. 9(*b*) on the display unit 251. At this time, the contents setting screen 850 may include information about a departure place/destination place 851, information about an estimated driving time 852, a list of recommended contents 853, a list of recently watched contents, and contents search items (not shown).

According to the user input received through the contents setting screen, the mobile terminal 200 may select contents to be watched by the user while the vehicle is driving. When contents are selected, the mobile terminal 200 may display a pop-up window including information about play time of the selected contents, price for watching the contents, contents free watch option, and estimated price on the display unit 251. Here, the contents free watch option is used to provide a free watch function for those contents holding predetermined advertisements.

Also, at the time of selecting contents, the mobile terminal 200 may display a first indicator 855 indicating estimated driving time and a second indicator 856 indicating contents play time on the display unit 251. Afterwards, when selection of the contents is completed or a fee-saving option menu is selected, the mobile terminal 200 may display an advertisement setting screen on the display unit 251.

FIGS. 10 to 13 illustrate the operation of a mobile terminal for setting advertisements to be consumed in a vehicle at the time of reserving the vehicle.

Referring to FIGS. 10 to 13, when selection of the contents is completed or a separate fee-saving option menu is selected, the mobile terminal 200 may display an advertisement setting screen (or fee-saving option screen 1010) on the display unit 251.

The advertisement setting screen 1010 may include information about a departure/destination place 1010, a first indicator 1012 indicating estimated driving time, a second indicator 1013 indicating contents play time, a third indicator 1014 indicating the position of video advertisements included in the contents, and a fourth indicator 1015 indicating the position of a banner advertisement included in the contents. Here, the advertisement setting screen 1010 is an advertisement setting screen reflecting the contents free watching option described above.

Also, the advertisement setting screen 1010 may include a first option menu 1020 for setting the amount of advertisements, a second option menu 1030 for setting watch time of the advertisements, and a third option menu 1040 for setting categories of the advertisements.

The first option menu 1020 may include a first progress bar 1021 and a detailed view icon 1022 for setting the number of video advertisements or play time. The first progress bar 1021 indicates the amount of current video advertisements, and an icon 1023 for adjusting the amount of the video advertisements is displayed.

The second option menu 1030 may include a first item 1031 for setting the watch time of video advertisements evenly over the whole contents, a second item 1032 for setting the watch time in the middle of the contents, a third item 1033 for setting the watch time at the front of the contents, and a fourth item 1034 for setting the watch time at the rear of the contents. The first to the fourth item 1031-1034 may include information about the price discounted according to the corresponding watch time.

The third option menu 1040 may include a plurality of items for setting categories of advertisements. The plurality of items includes but is not limited to a hobby item, travel item, restaurant item, and baby-care item.

Also, the advertisement setting screen 1010 may include real-time rate discount information and information about an estimated price 1050.

While the advertisement setting screen 1010 is displayed, if a user input 1024 dragging an icon 1023 located in the first progress bar 1021 of the first option menu 1020 to the left or right direction, the mobile terminal 200 may set the amount of video advertisements to be consumed in the vehicle.

Figure 10:
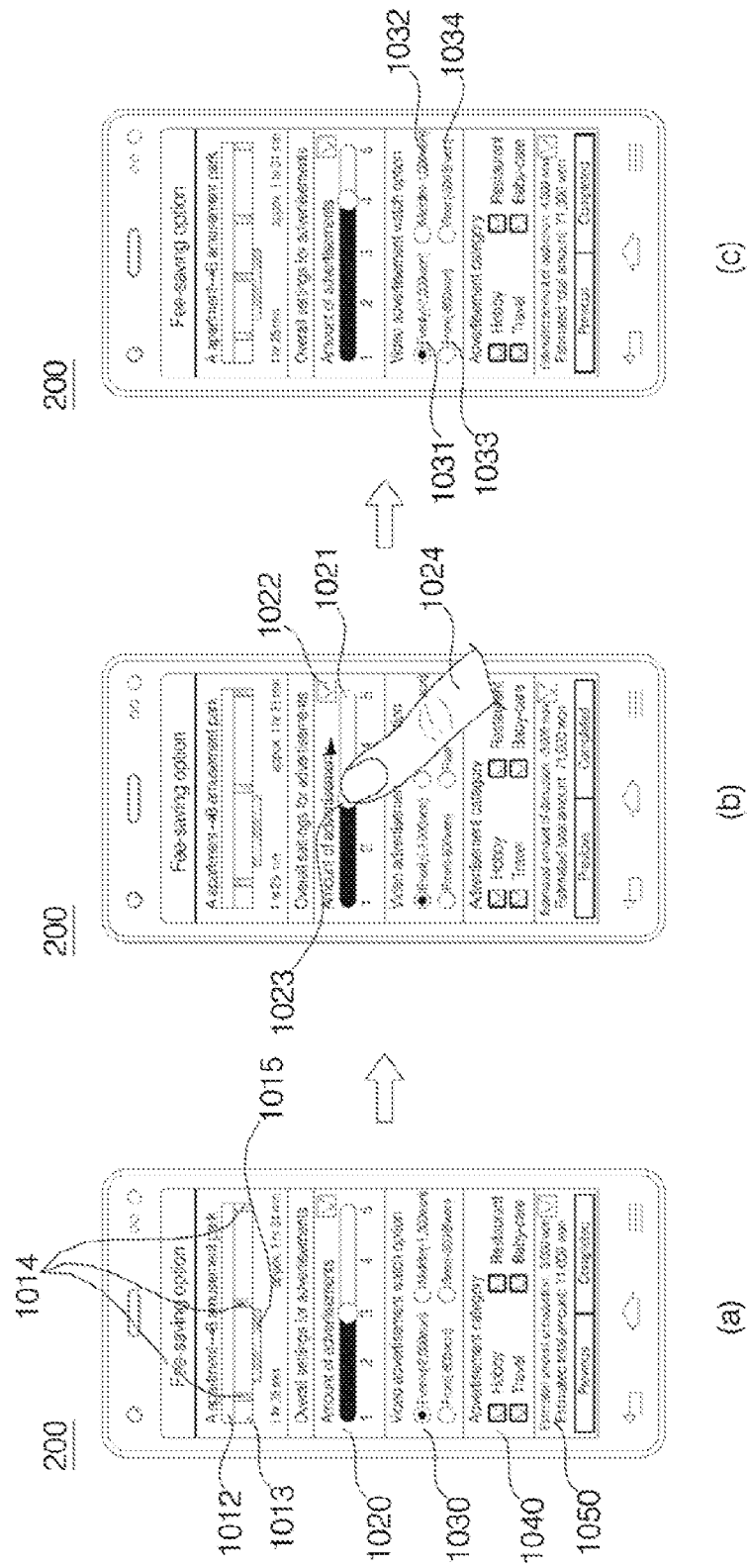
FIGS. 10 to 13 illustrate the operation of a mobile terminal for setting advertisements to be consumed in a vehicle at the time of reserving the vehicle.

In this case, as shown in FIG. 10 (*c*), the mobile terminal 200 may update and display the fee deduction information and estimated rate information 1050 in real time according to the amount of the video advertisements. In addition, the mobile terminal 200 may change the third indicator 1014 according to the amount of video advertisements and display the changed indicator.

Figure 11:
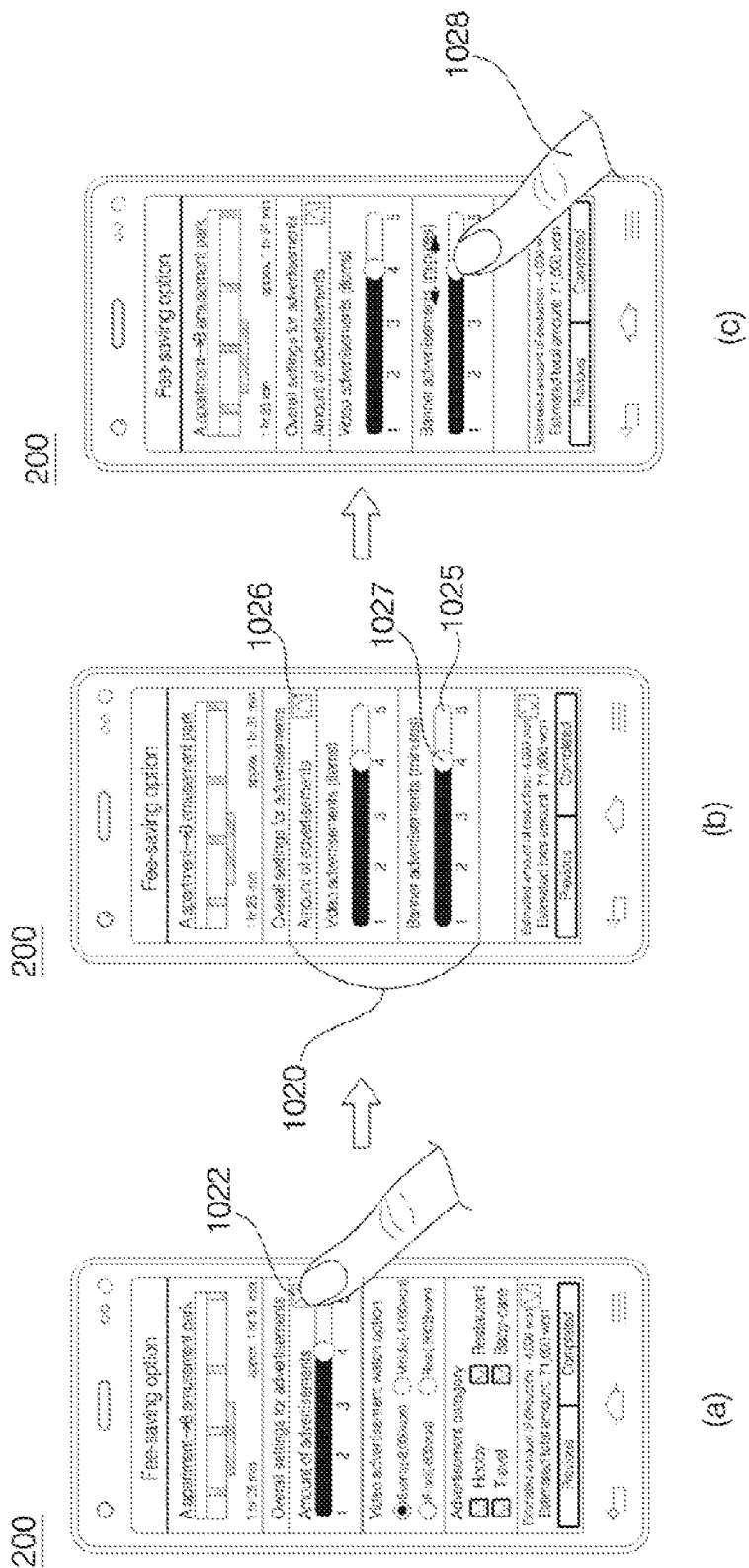

Meanwhile, as shown in FIG. 11, when the detailed view icon 1022 included in the first option menu 1020 is selected, the mobile terminal 200 may change the detailed view icon 1022 into a quick view icon 1026 and at the same time, may additionally display the second progress bar 1025 for setting the play time of a banner advertisement. The second progress bar 1025 indicates an amount of the current banner advertisements, and an icon 1027 for adjusting the amount of the banner advertisements is displayed.

When a user input 1028 dragging the icon 1027 located in the second progress bar 1025 to the left/right direction is received, the mobile terminal 200 may set the amount of banner advertisements to be consumed in the vehicle.

Similarly, although not shown in the figure, the mobile terminal 200 may update and display the fee deduction information and estimated rate information 1050 in real time according to the amount of the banner advertisements. In addition, the mobile terminal 200 may change the fourth indicator 1015 according to the amount of the banner advertisements and display the changed indicator.

Figure 12:
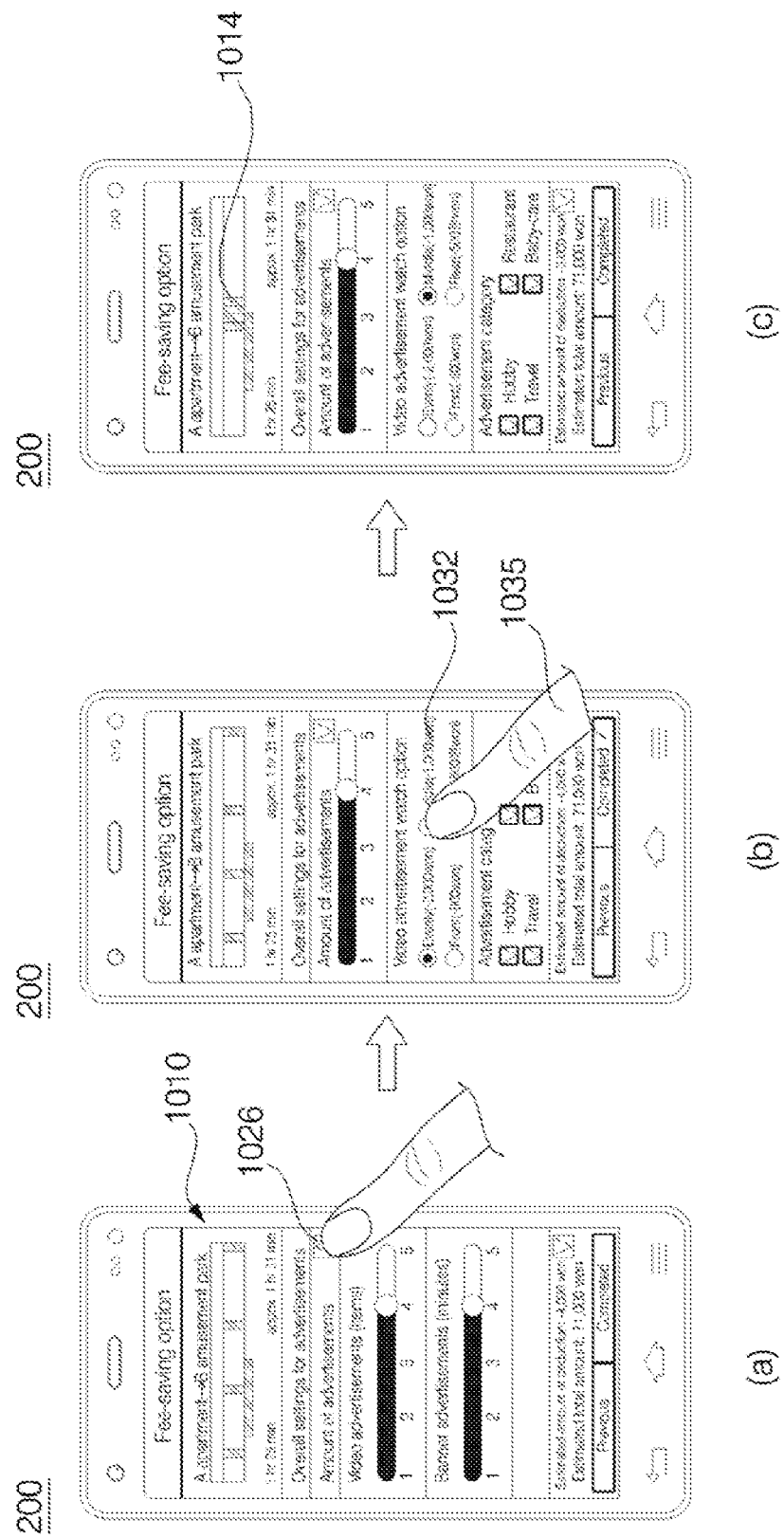

Afterwards, as shown in FIG. 12, when a quick view icon 1026 included in the first option menu 1020 is selected, the mobile terminal 200 may again display the first option menu 1020 including only the first progress bar 1021 and the detailed view icon 1022.

When the user input 1035 which touches any one 1032 of the items included in the second option menu 1030 is received while the advertisement setting screen 1010 is displayed, the mobile terminal 200 may set the watching time of the video advertisement as the watching time corresponding to the touched item 1032.

In this case, as shown in FIG. 12(*c*), the mobile terminal 200 may update and display the fee deduction information and estimated rate information 1050 in real time according to the watching time of the video advertisements. In addition, the mobile terminal 200 may change the third indicator 1014 according to the watching time of the video advertisement and display the changed indicator.

Also, although not shown in the figure, when a user input selecting one or more of the items included in the third option menu 1040 is received, the mobile terminal 200 may set the categories of the advertisements to be watched to the categories corresponding to the selected items.

Figure 13:
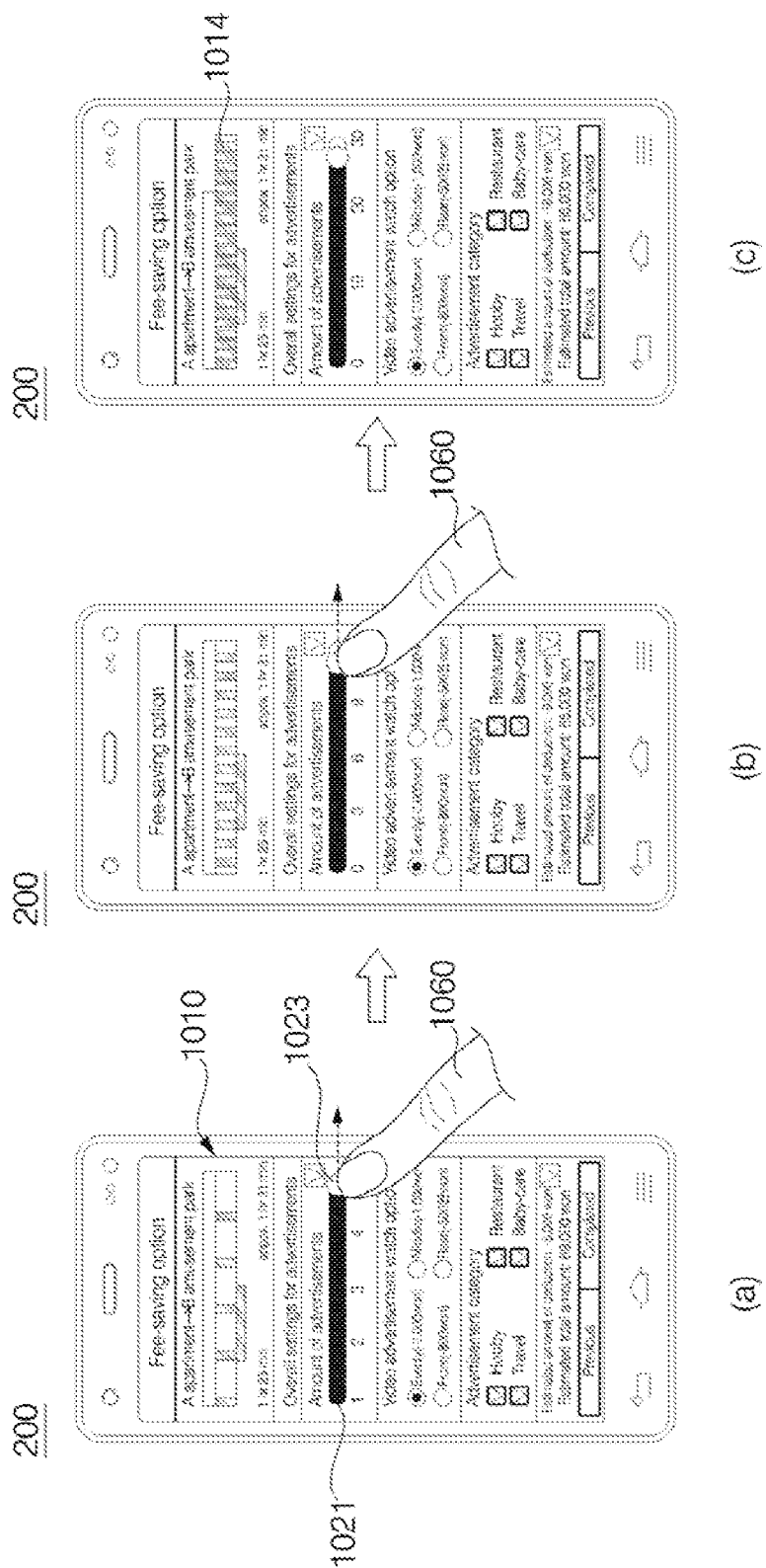

Meanwhile, as shown in FIG. 13, when a user input 1060 continuously dragging the icon 1023 located in the first progress bar 1021 of the first option menu 1020 to the right direction is received, the mobile terminal 200 may set the amount of advertisements to gradually increase according to a dragging distance of the user input 1060. At this time, the mobile terminal 200 may update and display fee deduction information and estimated rate information 1050 in real time according to the amount of advertisements. Also, the mobile terminal 200 may change the third indicator 1014 according to the amount of the advertisements and display the changed indicator.

In addition, the mobile terminal 200 may be set to play only the advertisements over the whole boarding time in accordance with the user's continuous dragging input. In addition, according to the continuous dragging input of the user, the mobile terminal 200 may be configured to play additional advertisements through the mobile phone so that the user may watch the additional advertisements even after the user gets off the vehicle.

Figure 14:
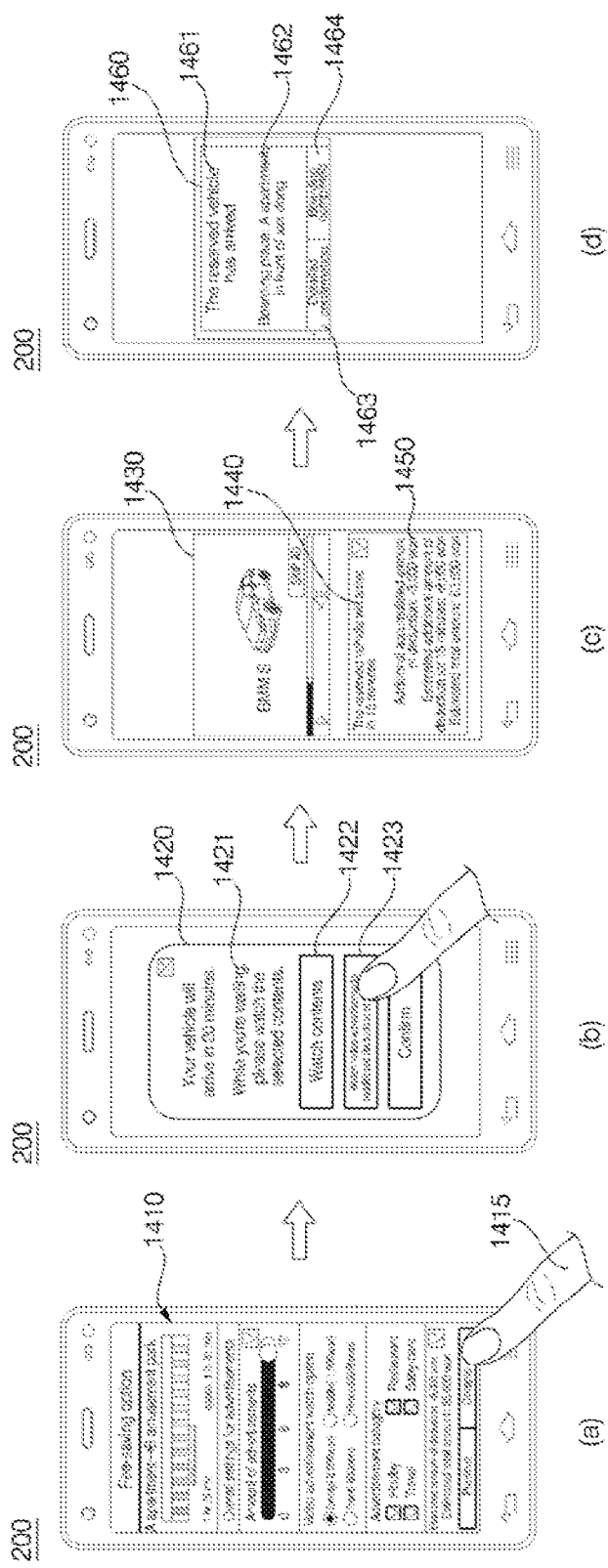
FIG. 14 illustrates the operation of a mobile terminal which allows a passenger to watch contents or advertisements while waiting after vehicle reservation is completed.

FIG. 14 illustrates the operation of a mobile terminal which allows a passenger to watch contents or advertisements while waiting after vehicle reservation is completed.

Referring to FIG. 14, when the completion icon 1415 displayed on the advertisement setting screen 1410 is selected, the mobile terminal 200 may transmit a signal requesting a vehicle driving service to the service providing server 300. At this time, the service request signal may include vehicle reservation information; and contents and advertisement setting information.

The mobile terminal 200 may display a pop-up window 1420 including information 1421 about the estimated arrival time of the vehicle, a contents watching menu 1422 suggesting watching selected contents during the waiting time, and an advertisement watching menu 1423 suggesting watching video advertisements during the waiting time on the display unit 251. The advertisement watching menu 1423 may display information about an estimated amount to be deducted through watching advertisements during the waiting time.

When the contents watching menu 1422 is selected, the mobile terminal 200 may play the contents received from the service providing server 300 on the display unit 251. On the other hand, when the advertisement watching menu 1423 is selected, the mobile terminal 200 may play video advertisements 1430 received from the service providing server 300 on the display unit 251. At this time, the mobile terminal 200 may display, on the display unit 251, real-time information 1430 about estimated arrival time and information 1440 about the fee subtracted in real time while the advertisement is being watched.

When the vehicle arrives, the mobile terminal 200 may display a pop-up window 1460 including vehicle arrival notification information 1461, boarding position information 1462, detailed confirmation icon 1463, and boarding completion icon 1464 on the display unit 251.

When the user of the mobile terminal 200 selects the detailed confirmation icon 1463, the mobile terminal 200 may display a map screen (not shown) showing a detailed location of the arrival vehicle on the display unit 251. When the user touches the boarding completion icon 1464 displayed on the display unit 251 at the time of boarding the vehicle, the vehicle 100 may recognize the user's boarding through wireless communication with the mobile terminal 200 and play reserved contents and advertisements on the display unit 141.

In what follows, with reference to FIGS. 15 to 21, the operation of a mobile terminal for providing fee deduction information in real-time while a vehicle is driving and for changing or adding contents and advertisements to be consumed inside the vehicle will be described in detail.

Figure 15:
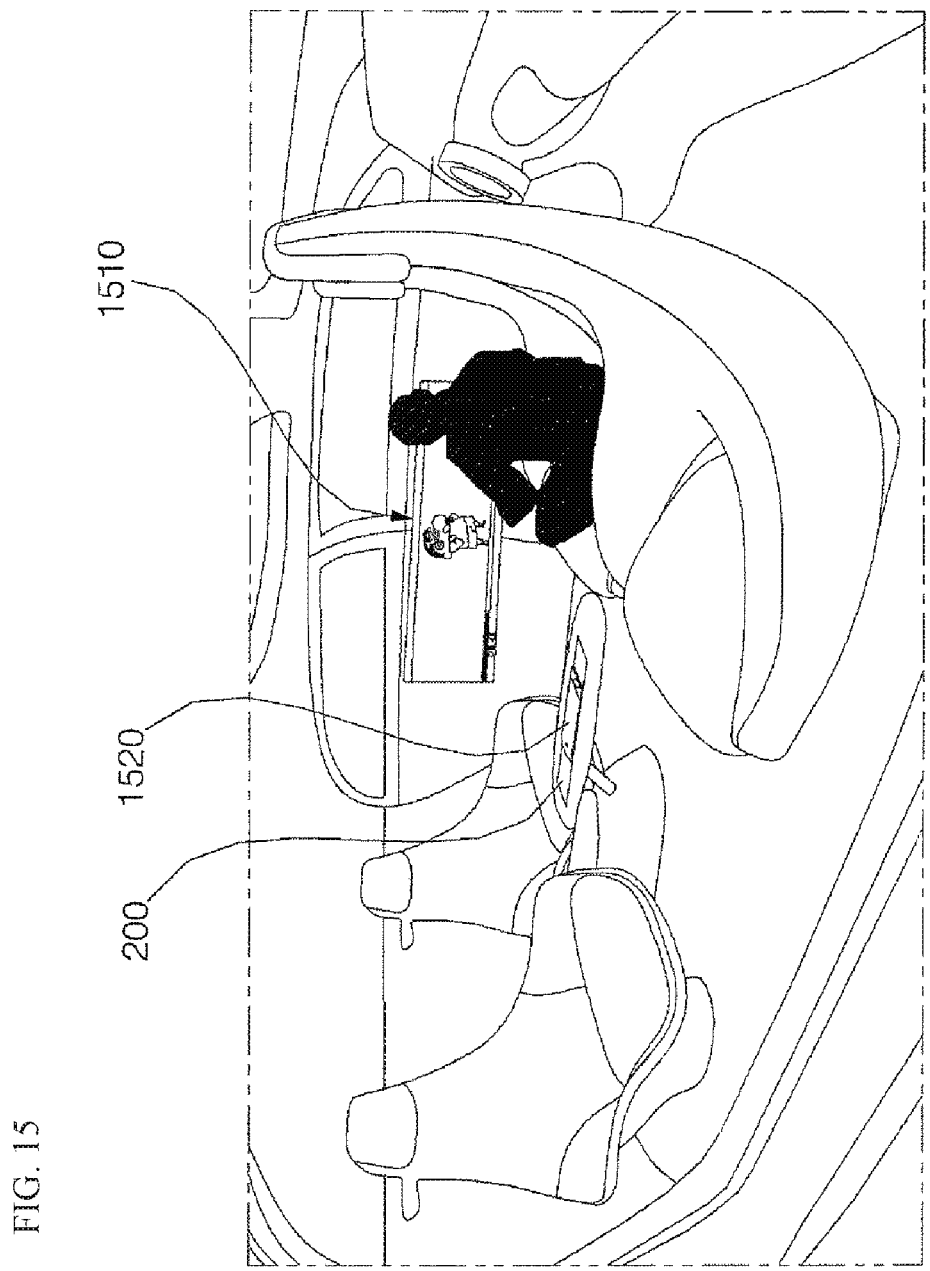
FIG. 15 illustrates the operation of a vehicle for providing reserved contents and advertisements when a passenger gets into the vehicle.

FIG. 15 illustrates the operation of a vehicle for providing reserved contents and advertisements when a passenger gets into the vehicle.

Referring to FIG. 15, the vehicle 100 may confirm boarding of a passenger through wireless communication with the mobile terminal 200 or through various detection sensors installed inside the vehicle.

For example, when a boarding completion icon displayed on the mobile terminal 200 is selected, the vehicle 100 may detect a passenger's boarding through wireless communication with the mobile terminal 200. Also, when the mobile terminal 200 is held near an NFC apparatus installed in the vehicle, the vehicle 100 may detect a passenger's boarding through short range wireless communication with the mobile terminal 200. In addition, the vehicle 100 may receive a beacon message transmitted from the mobile terminal 200 and sense a passenger's boarding. Also, when the mobile terminal 200 is connected to a charger provided in the seat, the vehicle 100 may detect a passenger's boarding through wired communication with the mobile terminal 200. In addition, the vehicle 100 may detect the boarding of a passenger by using a camera, pressure sensor, and fingerprint recognition sensor installed therein.

When the passenger's boarding is confirmed, the vehicle 100 may play contents and advertisements reserved by the passenger on a public screen 1510 or on a personal screen (not shown). Here, the public screen 1510 is a large-screen display device disposed for passengers to watch together while the personal screen is a small screen display device disposed for passengers to watch individually. The public screen 1510 may be installed on the inner side of a vehicle door, vehicle glass, or vehicle ceiling; the personal screen may be installed at or near a seat. When the public screen 1510 is installed on the vehicle glass, the public screen 1510 can be implemented as a transparent display.

In addition, when confirming boarding of passengers, the vehicle 100 may switch vehicle glasses from a transparent color to an opaque color so that passengers in the vehicle or the contents being played may not be seen from outside.

When the mobile terminal 200 is placed on a wireless recharging table 1520 installed in the vehicle 100, the vehicle 100 may charge the mobile terminal wirelessly by using magnetic resonance generated in the wireless charging table 1520. Also, when the mobile terminal 200 is placed on the wireless charging table 1520, the vehicle 100 may be allowed to automatically connect to a wireless network or a web service provided by the mobile terminal 200 through short range wireless communication with the mobile terminal 200.

Figure 16:
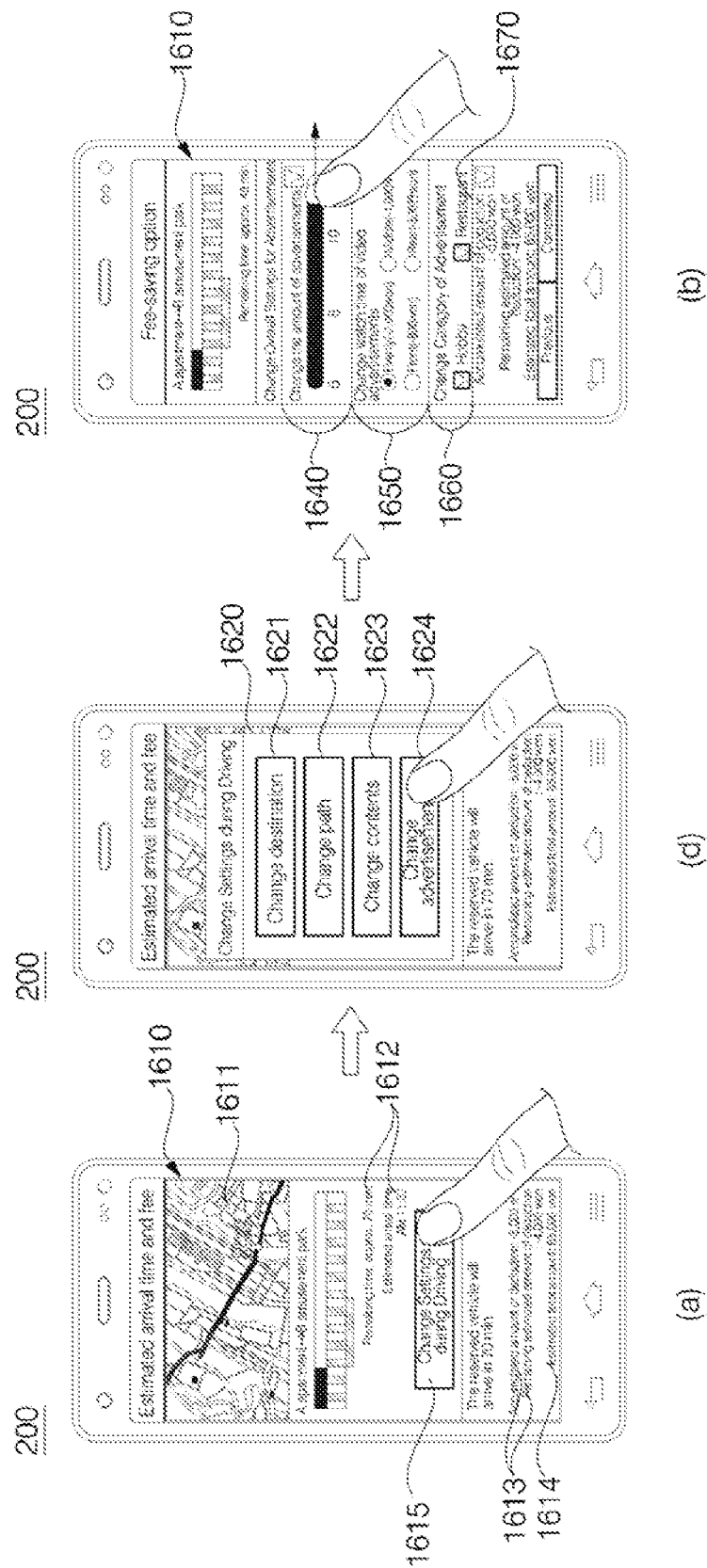
FIG. 16 illustrates the operation of a mobile terminal capable of changing contents and advertisements to be consumed in a vehicle during driving of the vehicle.

FIG. 16 illustrates the operation of a mobile terminal capable of changing contents and advertisements to be consumed in a vehicle during driving of the vehicle.

Referring to FIG. 16, during driving of the vehicle, the mobile terminal 200 may display a driving notification screen 1610 including information about a vehicle's position and driving path 1611, information about estimated arrival time 1612, real-time fee deduction information 1613, estimated fee information 1614, and a setting change menu during driving 1615 on the display unit 251.

While the driving notification screen 1610 is displayed, if the setting change menu 1615 during driving is selected, the mobile terminal 200 may display a pop-up window including a destination change menu 1621, path change menu 1622, contents change menu 1623, and advertisement change menu 1624 on the display unit 251.

When the advertisement changing menu 1624 is selected, the mobile terminal 200 may display the advertisement setting change screen 1630 as shown in FIG. 16(*c*) on the display unit 251. At this time, the advertisement setting change screen 1630 may include a first option menu 1640 for changing the amount of advertisements, a second option menu 1650 for changing watching time of the advertisements, a third option menu 1660 for changing categories of the advertisements, and real-time rate deduction information according to the change of the advertisements and estimated rate information 1670.

The mobile terminal 200 may change the amount of advertisements, watching time of the advertisements, and categories of the advertisements according to the user input received through the advertisement setting change screen 1630 and transmits a signal requesting playing of the changed advertisements to the service providing server 300 or to the vehicle 100. In response to the request signal, the vehicle 100 may play the changed advertisements on a public or personal screen.

Meanwhile, although not shown in the figure, the user of the mobile terminal 200 may change the destination and driving path of a vehicle while the vehicle is driving by using the destination change menu 1621 and the path change menu 1622. In addition, the user of the mobile terminal 200 may change the contents to be consumed in the vehicle 100 by using the contents change menu 1623.

Figure 17:
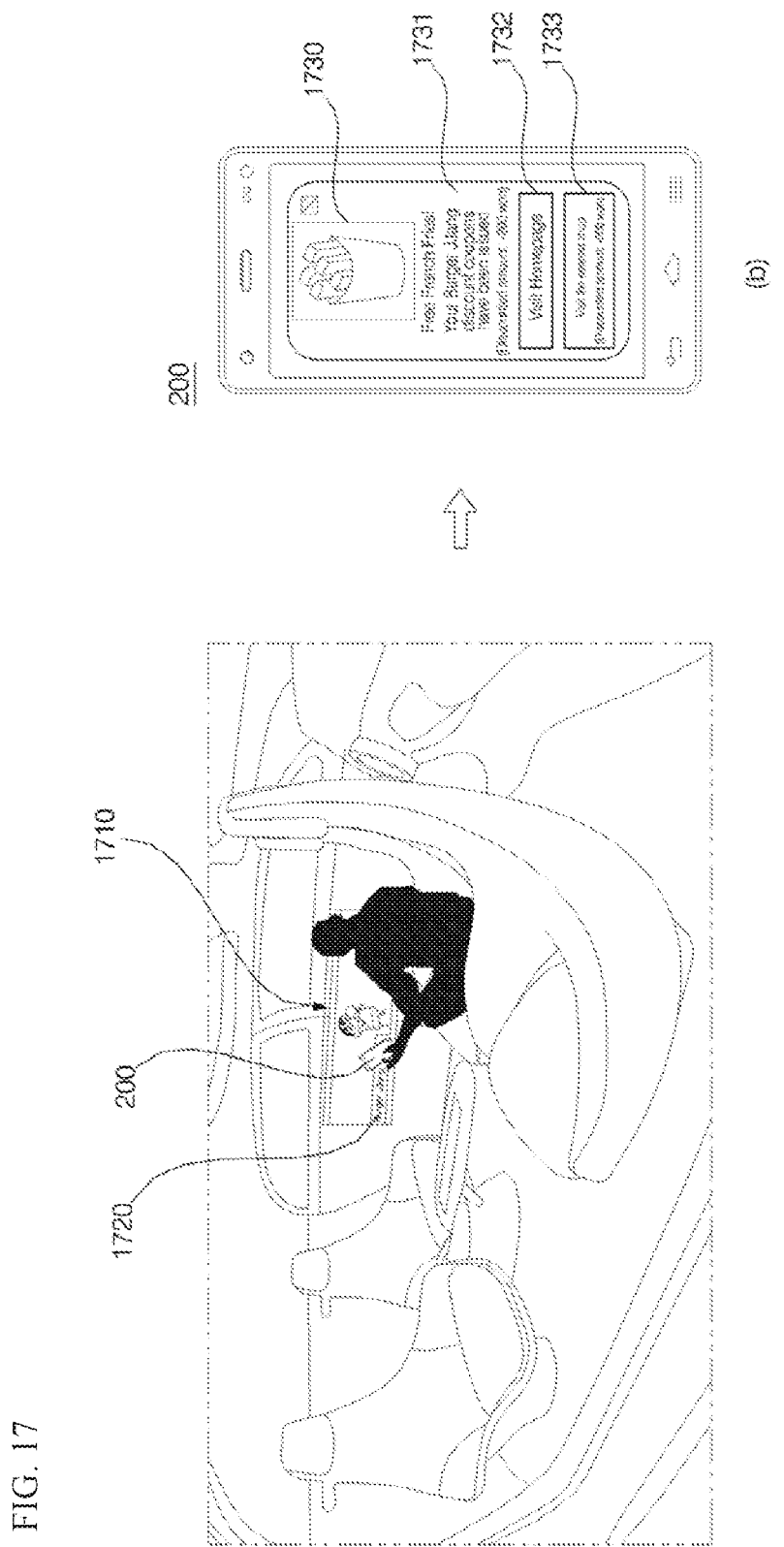
FIG. 17 illustrates the operation of a mobile terminal capable of reducing a fee by downloading information related to the advertisement being watched during driving of a vehicle.

FIG. 17 illustrates the operation of a mobile terminal capable of reducing a fee by downloading information related to the advertisement being watched during driving of a vehicle.

Referring to FIG. 17, the vehicle 100 may play a video advertisement on a public screen 1710 or display a banner advertisement in a lower portion of the public screen 1710. At this time, the video advertisement or banner advertisement may include an NFC tag or QR code.

If the mobile terminal 200 is held near the video advertisement or banner advertisement, the mobile terminal 200 may get a discount on the vehicle fee after downloading information about the video or banner advertisement and discount coupons.

For example, as shown in FIG. 17(*b*), if the mobile terminal 200 is held near the banner advertisement 1720, the mobile terminal 200 may display a notification window 1730 about the banner advertisement 1720 on the display unit 251. At this time, the notification window 1730 may include discount coupon issue and rate reduction information 1731, homepage access menu 1732, and branch visit menu 1733.

When the homepage access menu 1732 is selected, the mobile terminal 200 may display a homepage screen related to the banner advertisement on the display unit 251 by operating a web browser. On the other hand, when the branch visit menu 1733 is selected, the mobile terminal 200 may set the nearest point among the branches located on the path that goes to the destination as a via point to obtain a discount on the vehicle fee.

Figure 18:
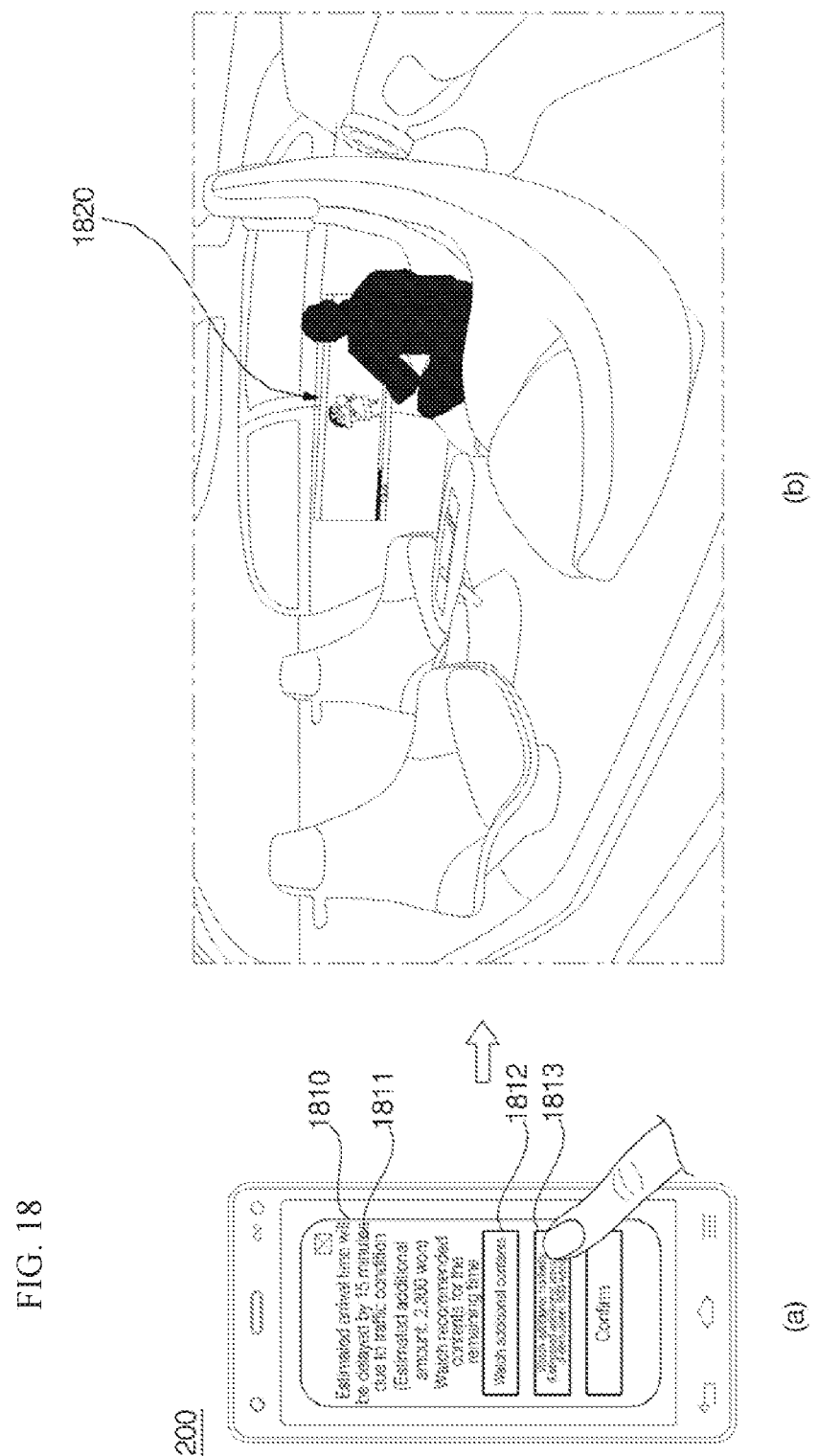
FIG. 18 illustrates the operation of a mobile terminal capable of proposing additional watching of contents or advertisements when the amount of driving time is increased.

FIG. 18 illustrates the operation of a mobile terminal capable of proposing additional watching of contents or advertisements when the amount of driving time is increased.

Referring to FIG. 18, when the driving time increases due to traffic condition, the mobile terminal 200 may display a pop-up window including information 1811 about estimated delay time/estimated additional charge, recommended contents watching menu 1812, and additional advertisement watching menu 1813 on the display unit 251. At this time, the additional advertisement watching menu 1813 may display information about an estimated amount to be subtracted through watching advertisements during the delay time.

When the recommended contents watching menu 1812 is selected, the mobile terminal 200 may transmit a signal requesting playing of the recommended contents to the service providing server 300 or to the vehicle 100. The vehicle 100, in response to the request signal, may additionally play the recommended contents on the public screen.

Meanwhile, when the additional advertisement watching menu 1813 is selected, the mobile terminal 200 may transmit a signal requesting playing of the advertisements to the service providing server 300 or to the vehicle 100. The vehicle 100, in response to the request signal, may additionally play predetermined advertisements on the public screen 1820. The user of the mobile terminal 200 may obtain a further discount on the vehicle fee through additional watching of the advertisements.

Figure 19:
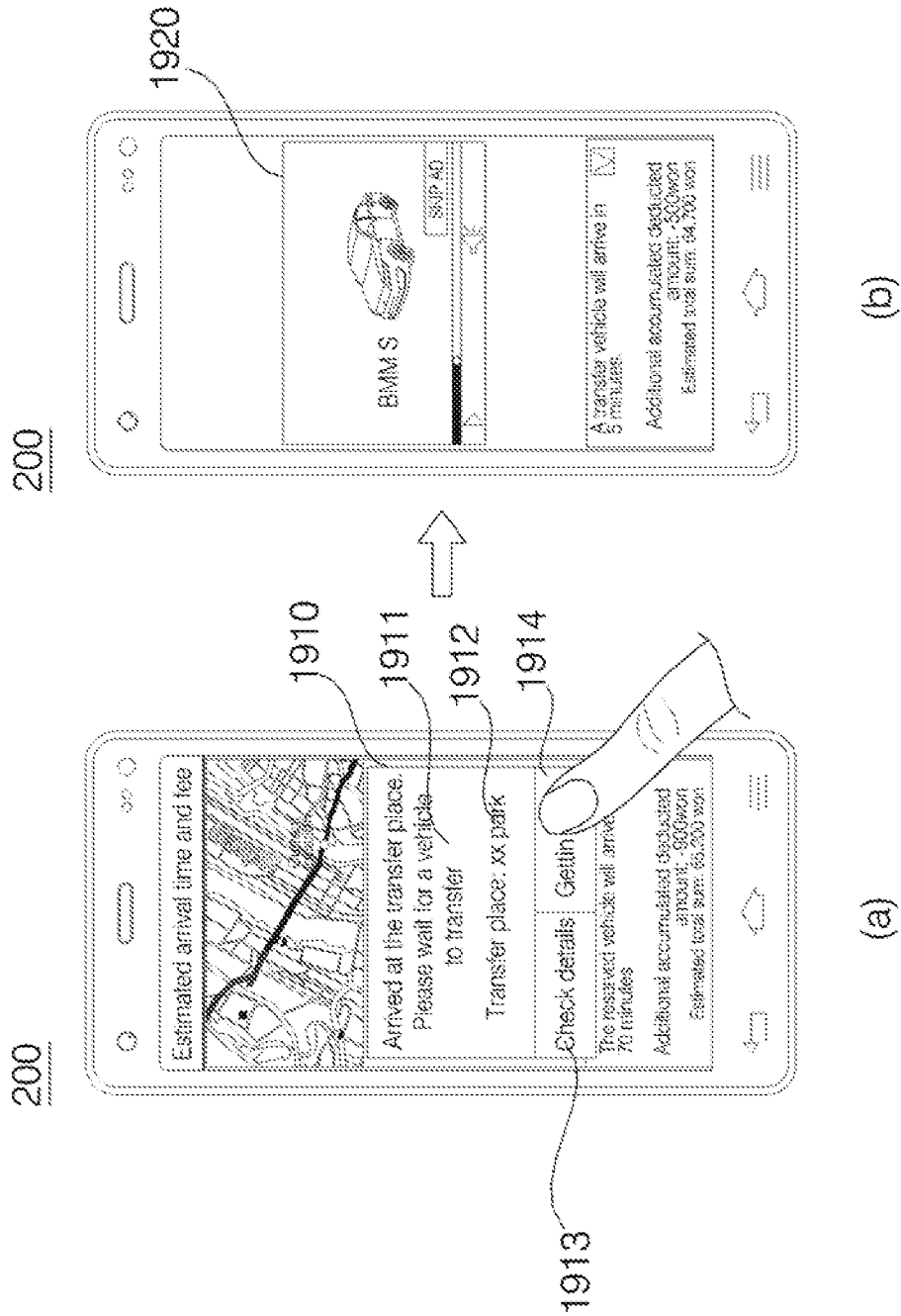
FIG. 19 illustrates the operation of a mobile terminal capable of reducing a fee through watching of advertisements while waiting at the time of transfer of vehicles.

FIG. 19 illustrates the operation of a mobile terminal capable of reducing a fee through watching of advertisements while waiting at the time of transfer of vehicles.

Referring to FIG. 19, when the user arrives at a transfer place, the mobile terminal 200 may display a pop-up window including a transfer place arrival notification information 1911, transfer location information 1912, detailed confirmation icon 1913, and getting-off completion icon 1914 on the display unit 251.

When the user of the mobile terminal 200 selects the detailed confirmation icon 1913, the mobile terminal 200 may display a map screen (not shown) showing a detailed location of a transfer place on the display unit 251. Meanwhile, if the user touches the getting-off completion icon 1914 displayed on the display unit 251, the mobile terminal 200 recognizes that the user has got off the vehicle.

While waiting for transfer of a vehicle, the mobile terminal 200 may continuously display unwatched video advertisements 1920 on the display unit 251 as shown in FIG. 19(*b*). At this time, the mobile terminal 200 may display information 1921 about estimated arrival time of a transfer vehicle, fee deduction information 1922, and estimated fee information 1923 on the display unit 251.

Also, when the screen is turned off while an ear set is plugged to the mobile terminal 200, the mobile terminal 200 may be controlled to output a voice advertisement through the sound output unit 252 instead of playing a video advertisement. When the user listens to a voice advertisement, an amount of deduction may be somewhat smaller than that obtained from watching a video advertisement.

Meanwhile, in another embodiment, when the user is waiting for transfer of a vehicle, the mobile terminal 200 may continuously display the remaining part of the contents being watched in a driving vehicle on the display unit 251.

When a transfer vehicle arrives, the mobile terminal 200 may display a notification signal notifying of arrival of the transfer vehicle on the display unit 251.

Figure 20:
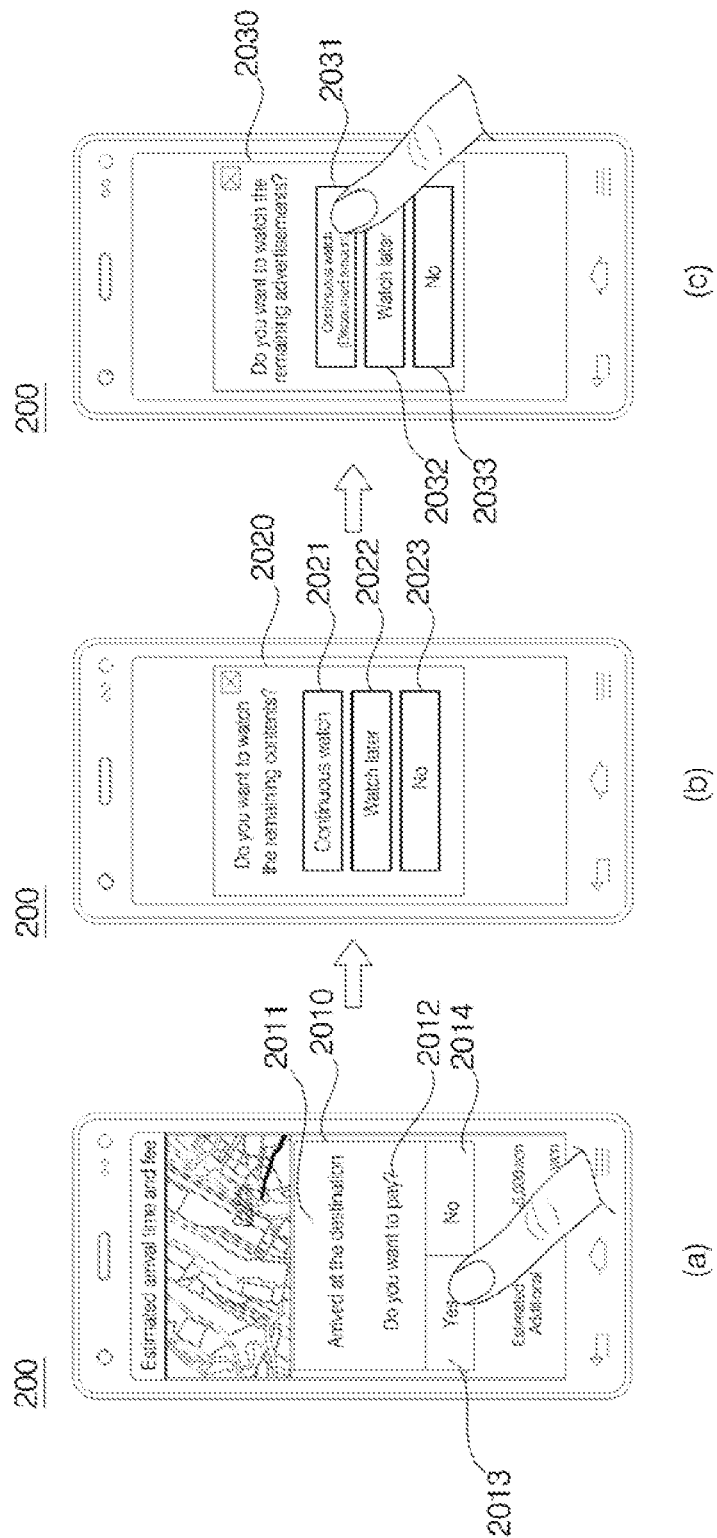
FIGS. 20 and 21 illustrate the operation of a mobile terminal capable of proposing watching of remained contents or advertisements upon arriving at a destination.
Figure 21:
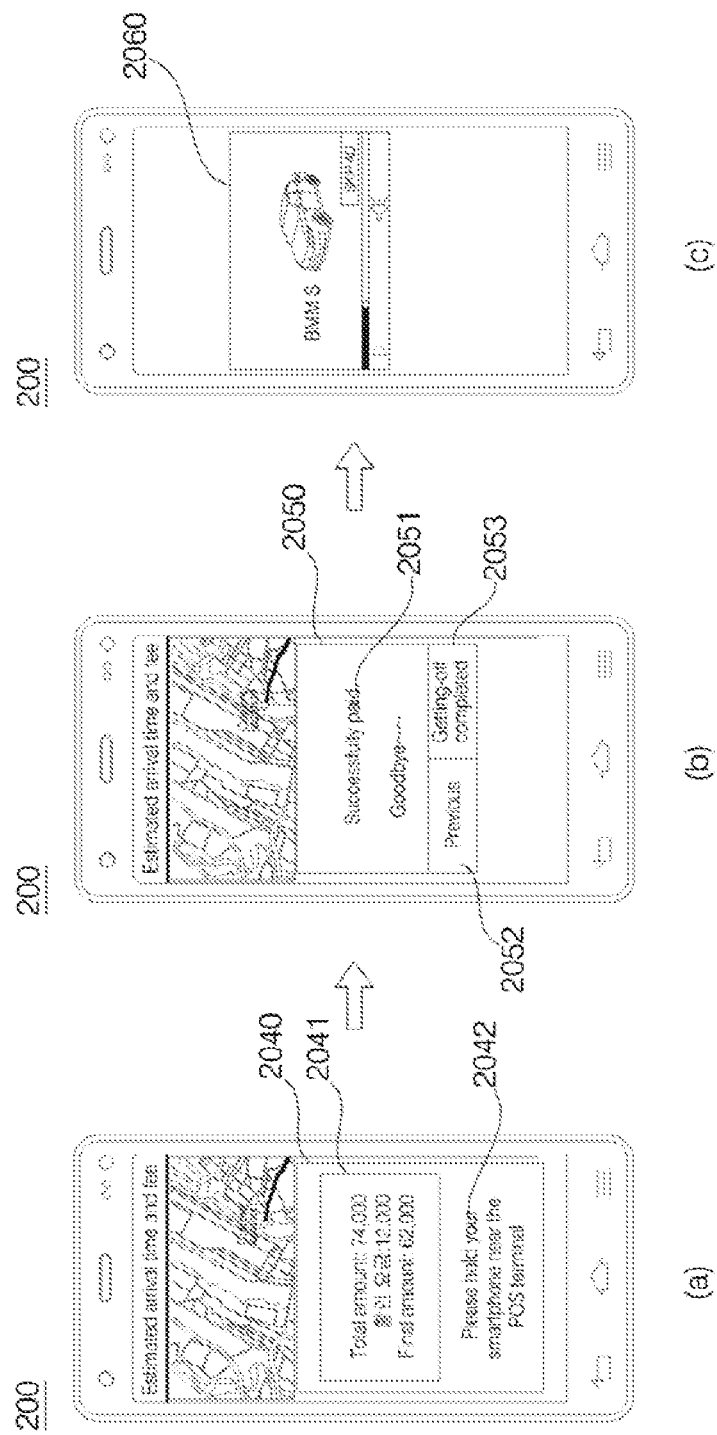

FIGS. 20 and 21 illustrate the operation of a mobile terminal capable of proposing watching of remained contents or advertisements upon arriving at a destination.

Referring to FIGS. 20 and 21, when the vehicle arrives at a destination, the mobile terminal 200 may display a first pop-up window 2010 including destination arrival notification information 2011, payment request information 2012, yes icon 2013, and no icon 2014 on the display unit 251.

When the yes icon 2013 of the first pop-up window 2010 is selected, the mobile terminal 200 may display a second pop-up window 2020 for inquiring whether to watch the remaining contents continuously on the display unit 251. In this case, the second pop-up window 2020 may include a continuous watch icon 2021, watch later icon 2022, and no icon 2023. When the continuous watch icon 2021 is selected, the mobile terminal 200 may continuously play the remaining contents, but an additional data charge may occur.

When the no icon 2023 of the second popup window 2020 is selected, the mobile terminal 200 may display a third popup window 2030 for inquiring whether to watch the remaining advertisements continuously on the display unit 251. At this time, the third pop-up window 2030 may include a continuous watch icon 2031, watch later icon 2032, and no icon 2033. The continuous watch icon 2031 may then display information about an estimated amount to be deducted through watching advertisements.

When the continuous watch icon 2031 of the third pop-up window 2030 is selected, the mobile terminal 200 may display a fourth pop-up window including payment information 2041 and payment guide information 2041 on the display unit 251.

When the mobile terminal 200 is held near a POS terminal according to the payment guide information 2042 of the fourth pop-up window, the mobile terminal 200 may perform electronic payment by executing a predetermined payment application. When payment is completed, the mobile terminal 200 may display a fifth pop-up window 2050 including payment completion notification information 2051, previous icon 2052, and getting-off completion icon 2053 on the display unit 251.

When the getting-off icon 2053 of the fifth pop-up window is selected, the mobile terminal 200 may recognize that the user has got off the vehicle and display the remaining advertisement video 2060 on the display unit 251.

Figure 22:
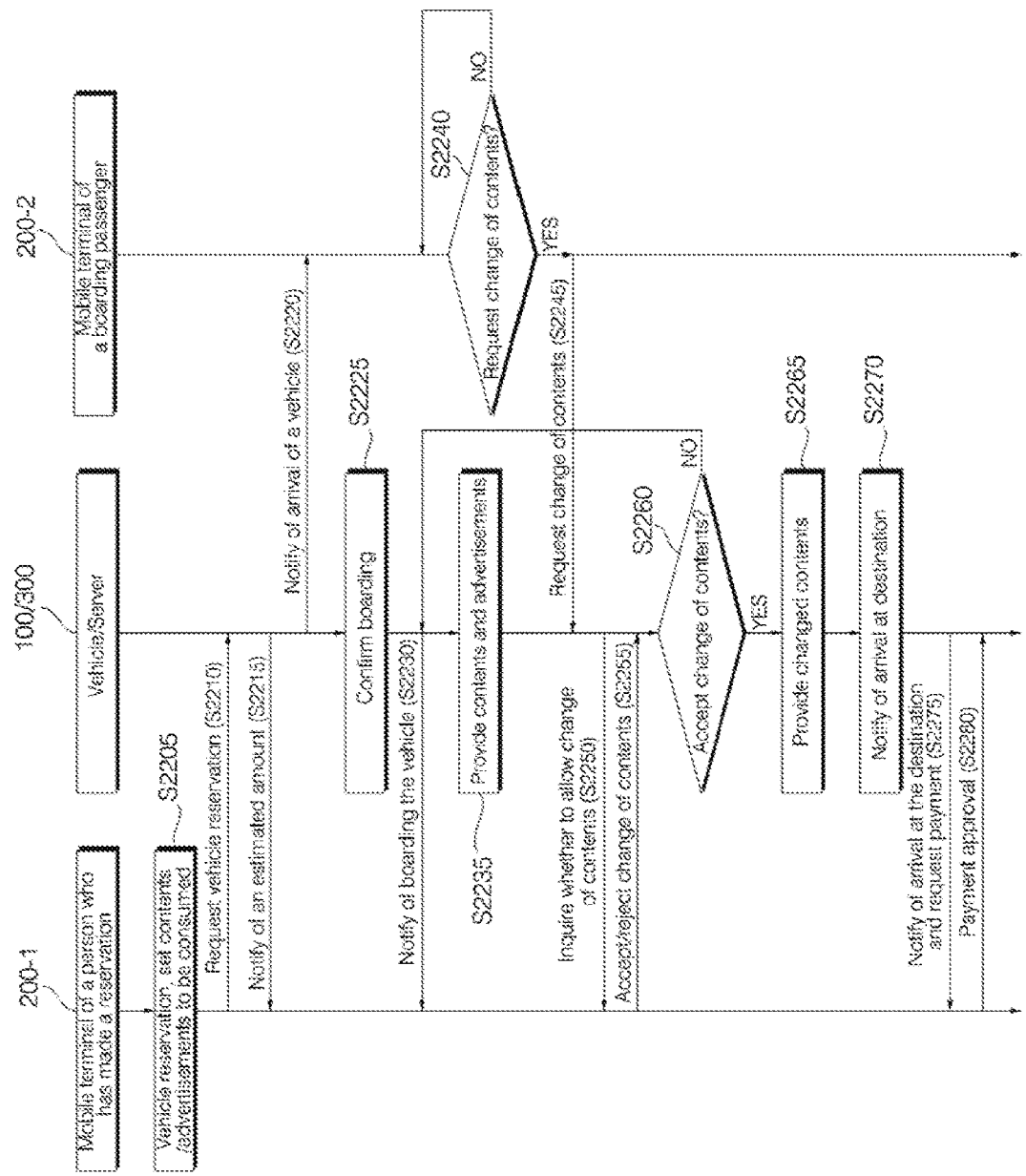
FIG. 22 is a flow diagram illustrating the overall operation of a mobile vehicle reservation system when a person who has reserved a vehicle and an actual passenger thereof are different.

FIG. 22 is a flow diagram illustrating the overall operation of a mobile vehicle reservation system when a person who has reserved a vehicle and an actual passenger thereof are different.

Referring to FIG. 22, a mobile vehicle reservation system according to one embodiment of the present invention includes a first 200_1 and a second mobile terminal 200_2 in which a mobile vehicle reservation application is installed, a vehicle 100 moving passengers to their destination, and a service providing server 300 providing a vehicle driving service to passengers. Here, it is assumed that the first mobile terminal 200_1 is a mobile terminal of a person who makes a reservation and the second mobile terminal 200_2 is a mobile terminal of a passenger.

The first mobile terminal 200_1 may execute a mobile vehicle reservation application according to a user command and display an execution screen of the corresponding application on the display unit 251.

The first mobile terminal 200_1 may reserve a vehicle for other person based on a user input on the execution screen and may set contents and/or advertisements to be consumed by the passenger inside the vehicle S2205.

When vehicle reservation is completed, the first mobile terminal 200_1 may transmit a signal requesting a vehicle driving service to the service providing server 300, S2210. At this time, the service request signal may include vehicle reservation information, contents and advertisement setting information, and passenger information.

In response to the service request signal, the service providing server 300 may transmit, to the first mobile terminal 200_1, notification information notifying that a vehicle driving service request has been successfully received and/or information about an estimated amount of payment S2215.

Also, the service providing server 300 may transmit, to the second mobile terminal 200_2, information about estimated arrival time of the vehicle 100, arrival place of the vehicle, and arrival notification information on the basis of the passenger information S2220.

When a passenger gets on the vehicle 200 according to the notification information provided by the second mobile terminal 200_2, the vehicle 100 may confirm boarding of the passenger through wireless communication with the second mobile terminal 200_2 or through a detection sensor installed inside the vehicle.

The vehicle 100 or the service providing server 300 may transmit notification information notifying of the corresponding passenger's boarding to the first mobile terminal 200_1 when boarding of the passenger is confirmed S2230. In another embodiment, the vehicle 100 may transmit an image of a passenger photographed by using an internal camera to the first mobile terminal 200_1 so that the person who has made the reservation may directly check the passenger riding the vehicle.

Also, when the passenger's boarding is confirmed, the vehicle 100 may receive, from the service providing server 300, contents and advertisement data set in advance by the person who has made the reservation and provide the receive contents and advertisement data through the display unit 141 installed inside the vehicle S2235.

Meanwhile, when a user command requesting change of contents is received from the passenger S2240, the second mobile terminal 200_2 may transmit a signal requesting change of contents to the vehicle 100 or to the service providing server 300.

Upon receiving the contents change request signal, the vehicle 100 or the service providing server 300 may transmit a signal inquiring whether to allow the contents change request of the passenger to the first mobile terminal 200_1, S2250. The first mobile terminal 200_1 may transmit a response signal as to whether to accept or reject the contents change request to the vehicle 100 or to the service providing server 300, S2255.

When contents change is rejected, the vehicle 100 may display existing contents on the display unit 141 and transmit notification information notifying that the contents change request has been rejected by the person who has made a reservation to the second mobile terminal 200_2.

When contents change is accepted, the vehicle 100 may receive the changed contents and provide the received contents through the display unit 141 installed in the vehicle S2265.

On the other hand, when the reservation is set so that the contents change is impossible, the vehicle 100 may continue to display the existing contents on the display unit 141 when a contents change request signal is received but also transmit notification information notifying that contents change is impossible to the second mobile terminal 200_2.

Also, it may be set so that the contents and/or advertisements being watched by the passenger may be changed or added while the vehicle is driving by the person who has made a reservation. Also, it may be set so that not only the passenger but also the person who has made a reservation watches advertisements through a mobile phone to get further discounts on the vehicle fee.

When the vehicle arrives at a predetermined destination, the vehicle 100 may display a message notifying of arrival at the destination on the display unit 141 or output a voice signal notifying of arrival at the destination through a sound output unit 142, S2270.

The vehicle 100 may transmit a signal notifying that the passenger has arrived at the destination to the first mobile terminal 200_1, S2275. At this time, the vehicle 100 may transmit an image of the passenger photographed by an CCTV at the destination to the first mobile terminal 200_1.

Also, the vehicle 100 may transmit a signal requesting payment to the first mobile terminal 200_1, S2275. If the person who has made the reservation confirms the passenger's getting off the vehicle, the first mobile terminal 200_1 may proceed with mobile payment according to the payment request of the person who has made the reservation S2280.

On the other hand, if the estimated fee and the final fee are different from each other, the person who has made the reservation may check the changed details and pay the final fee. Also, in another embodiment, it may be set so that the passenger may confirm the changed details and pay the final fee. Also, in a yet another embodiment, when the fee is increased, it may be set so that the initial amount may be paid by the person who has made the initial reservation, but the additional amount may be paid by the passenger; when the fee is less than estimated, the person who has made the initial reservation may make payment.

The present invention described above may be implemented by computer-readable codes in a recording medium storing programs. A recording medium that may be read by a computer includes all kinds of recording apparatus capable of storing the data that may be read by a computer system. Examples of a computer-readable recording medium include HDD (Hard Disk Drive), SSD (Solid State Disk), SDD (Silicon Disk Drive), ROM, RAM, CD-ROM, magnetic tape, floppy disk, and optical data storage device; and also include implementation in the form of carrier waves (for example, transfer through the Internet). Also, the computer may include the controller 180 of a terminal. Therefore, the detailed descriptions given above may not be interpreted in all aspects as limiting but regarded as illustrative. The technical scope of the present invention should be determined by rational interpretation of the appended claims, and it should be understood that all possible modifications within an equivalent scope of the present invention belong to the technical scope of the present invention.

The invention claimed is:

1. A mobile terminal, comprising:
a display unit configured to display information processed in a controller;
a wireless communication unit configured to provide a communication interface to and from a vehicle or an external server; and
the controller configured to set contents, an amount of advertisements, and a watching time of advertisements to be consumed inside the vehicle and provide fee deduction information according to the amount of the advertisements and the watching time of the advertisements to the display unit at the time of vehicle reservation,
wherein the controller is further configured to display an advertisement setting screen including an option menu for setting the watching time of the advertisements on the display unit,
wherein the option menu includes a first item for setting the watching time of video advertisements evenly throughout the contents, a second item for setting the watching time in the middle of the contents, a third item for setting the watching time at the front of the contents, and a fourth item for setting the watching time at the rear of the contents, and
wherein the controller is further configured to:
receive, via the wireless communication unit, the contents and the video advertisements according to the first item, the second item, the third item and the fourth item set in the option menu, and
display, on the display unit, the received contents and the video advertisements according to the first item, the second item, the third item and the fourth item set in the option menu.

2. The mobile terminal of claim 1, wherein, at the time of the vehicle reservation, the controller is configured to set at least one of departure place/destination place information, departure date and time information, driving path information, and vehicle type/screen size information.

3. The mobile terminal of claim 1, wherein, at the time of the vehicle reservation, the controller is configured to set a category of the advertisement and provide fee deduction information according to the category of the advertisement to the display unit.

4. The mobile terminal of claim 1, wherein the controller is configured to display a progress bar for setting the number of video advertisements or watching time thereof based on a dragging input on the display unit.

5. The mobile terminal of claim 1, wherein the controller is configured to display a progress bar for setting a watching time of banner advertisements based a dragging input on the display unit.

6. The mobile terminal of claim 1, wherein, when the vehicle reservation is completed, the controller is configured to provide a menu proposing watching advertisements during a waiting time for the vehicle and fee deduction information according to the watching advertisements.

7. The mobile terminal of claim 1, wherein, at the time of a transfer of vehicles, the controller is configured to play an advertisement being watched inside the vehicle during a waiting time for the transfer of vehicles on the display unit.

8. The mobile terminal of claim 1, wherein, when a vehicle driving time is increased, the controller is configured to provide a menu proposing additional watching of contents or advertisements.

* * * * *